US012645109B2

(12) United States Patent
Phare

(10) Patent No.: US 12,645,109 B2
(45) Date of Patent: Jun. 2, 2026

(54) INTEGRATED ISOLATOR AND CIRCULATOR SYSTEMS

(71) Applicant: Voyant Photonics, Inc., New York, NY (US)

(72) Inventor: Christopher T. Phare, New York, NY (US)

(73) Assignee: Voyant Phetonics, Inc., New York, NY (US)

( * ) Notice: Subject to any disclaimer, the term of this patent is extended or adjusted under 35 U.S.C. 154(b) by 516 days.

(21) Appl. No.: 18/177,256

(22) Filed: Mar. 2, 2023

(65) Prior Publication Data

US 2023/0288738 A1 Sep. 14, 2023

Related U.S. Application Data

(60) Provisional application No. 63/371,093, filed on Aug. 11, 2022, provisional application No. 63/346,344, filed on May 27, 2022, provisional application No. 63/316,633, filed on Mar. 4, 2022, provisional application No. 63/315,746, filed on Mar. 2, 2022.

(51) Int. Cl.
G02F 1/09 (2006.01)

(52) U.S. Cl.
CPC ..................................... G02F 1/093 (2013.01)

(58) Field of Classification Search
CPC ....................................................... G02F 1/093
See application file for complete search history.

(56) References Cited

U.S. PATENT DOCUMENTS

| | | |
|---|---|---|
| 2010/0322629 A1 | 12/2010 | Nagarajan et al. |
| 2016/0261352 A1 | 9/2016 | Wen et al. |
| 2018/0059332 A1 | 3/2018 | Mansouri Rad |
| 2018/0196197 A1* | 7/2018 | Sodagar ............... G02B 6/1228 |
| 2018/0284348 A1 | 10/2018 | Lin |
| 2020/0003954 A1 | 1/2020 | Liu et al. |
| 2020/0133034 A1 | 4/2020 | Schrans |
| 2020/0174188 A1 | 6/2020 | Van Thourhout |
| 2021/0273727 A1 | 9/2021 | Dong |
| 2022/0244584 A1* | 8/2022 | Scofield ............... G02F 1/0955 |
| 2023/0097053 A1 | 3/2023 | Doerr |

* cited by examiner

*Primary Examiner* — Thomas A Hollweg
*Assistant Examiner* — Kirsten D. Endresen
(74) *Attorney, Agent, or Firm* — Stratford Group Ltd.

(57) ABSTRACT

Disclosed are integrated photonics systems including integrated polarizing devices for implementing on-chip optical isolators and circulators. Implemented around a Faraday rotator isolator arrangement, integrated photonic components are arranged in a device to polarize and rotate the polarization of optical signals traversing forwards and backwards through the device to effect optical isolators and circulators.

26 Claims, 16 Drawing Sheets

INTEGRATED ISOLATOR AND CIRCULATOR SYSTEMS

CROSS-REFERENCE TO RELATED APPLICATIONS

This application claims the benefit of U.S. Provisional Patent Application No. 63/315,746, filed Mar. 2, 2022, U.S. Provisional Patent Application No. 63/316,633, filed Mar. 4, 2022, U.S. Provisional Patent Application No. 63/346,344, filed May 27, 2022 and U.S. Provisional Patent Application No. 63/371,093, filed Aug. 11, 2022, all of which are incorporated herein by reference in their entireties.

FIELD OF THE INVENTION

The present disclosure relates to photonics systems and particularly to on-chip isolators and circulators for photonics systems which incorporate integrated photonics for isolating and guiding optical signals.

BRIEF SUMMARY

According to a first aspect, there is provided an integrated photonics system including: at least one integrated chip; a first integrated polarizing device integrated in the at least one integrated chip for launching a first input optical signal received over a first component-side port of the first integrated polarizing device as a first polarized optical signal over a polarization-side port of the first integrated polarizing device into free space; and at least one Faraday rotator for receiving the first polarized optical signal, rotating a polarization of the first polarized optical signal, and generating a rotated first polarized optical signal travelling in a first direction, and for receiving a second polarized optical signal having the same polarization as the rotated first polarized optical signal and travelling in a second direction opposite from the first direction, rotating a polarization of the second polarized optical signal, and generating a rotated second polarized optical signal; in which the first integrated polarizing device is configured to receive the rotated second polarized optical signal over the polarization-side port of the first integrated polarizing device and to direct the rotated second polarized optical signal away from the first component-side port of the first integrated polarizing device.

Some embodiments further provide for a second integrated polarizing device integrated in the at least one integrated chip for launching the rotated first polarized optical signal received over a polarization-side port of the second integrated polarizing device as an output optical signal over a component-side port of the second integrated polarizing device, and for launching a second input optical signal received over the component-side port as the second polarized optical signal over the polarization-side port into free space toward the at least one Faraday rotator.

In some embodiments, the at least one Faraday rotator includes a first and a second 45° Faraday rotator, the first integrated polarizing device includes a first polarization splitter rotator (PSR), and the second integrated polarizing device includes a second PSR, the integrated photonics system further including: a first lens between the first PSR and the at least one Faraday rotator, for collimating the first polarized optical signal; a polarizer between the first 45° Faraday rotator and the second 45° Faraday rotator oriented at 45° relative to the polarization of the first polarized optical signal in the same rotational sense as the rotation imparted by the first 45° Faraday rotator; and a second lens between the at least one Faraday rotator and the second PSR, for focusing the rotated first polarized optical signal.

In some embodiments, the at least one Faraday rotator includes a 45° Faraday rotator and the second integrated polarizing device includes an integrated polarization controller (IPC) for generating the output optical signal with a polarization which is different from the polarization of the rotated first polarized optical signal, and for generating the second polarized optical signal from the second input optical signal, the second input optical signal having the same polarization as the output optical signal.

In some embodiments, the first integrated polarizing device is configured to substantially discard the rotated second polarized optical signal received by the first integrated polarizing device.

In some embodiments, the first integrated polarizing device is configured to substantially direct the rotated second polarized optical signal received by the first integrated polarizing device over a second component-side port of the first integrated polarizing device.

In some embodiments, the IPC includes: a polarization-side port facing the 45° Faraday rotator; at least one component-side port opposite the polarization-side port of the IPC; a polarization splitter rotator PSR including a first, a second, and a third port, the PSR coupled via its first port, over the polarization-side port of the IPC; a first set of waveguides coupled to the second and third ports of the PSR; a first phase shifter coupled along a first waveguide of the first set of waveguides; and a first splitter including a first set of ports and a second set of ports, the first splitter coupled to the PSR via its first set of ports and over the first set of waveguides, and coupled over at least one port of its second set of ports, via the at least one component-side port of the IPC.

Some embodiments further provide for a lens between the first integrated polarizing device and the 45° Faraday rotator.

In some embodiments, the first integrated polarizing device is one of a plurality of first integrated polarizing devices included in the integrated photonics system, the IPC is one of a plurality of IPCs included in the integrated photonics system, and the 45° Faraday rotator includes a shared 45° Faraday rotator for rotating polarizations of optical signals transmitted between the plurality of first integrated polarizing devices and the plurality of IPCs.

Some embodiments further provide for an array of lenses between the plurality of first integrated polarizing devices and the shared 45° Faraday rotator.

Some embodiments further provide for a single shared lens between the plurality of first integrated polarizing devices and the shared 45° Faraday rotator.

In some embodiments, each first integrated polarizing device of the plurality of first integrated polarizing devices and each IPC of the plurality of IPCs is angled relative to a focal plane of the single shared lens and the at least one integrated chip includes curved facets proximate locations where the first integrated polarizing devices and IPCs are integrated therein.

In some embodiments, the at least one Faraday rotator includes a 22.5° Faraday rotator, and the integrated photonics system further includes: a lens between the first integrated polarizing device and the 22.5° Faraday rotator; and a reflector situated on a side of the 22.5° Faraday rotator opposite the lens, for reflecting optical signals traversing the 22.5° Faraday rotator from the lens back into the 22.5° Faraday rotator towards the lens; in which the second integrated polarizing device includes an integrated polarization controller (IPC) for generating the output optical signal with a polarization which is different from the polarization of the rotated first polarized optical signal, and for generating the second polarized optical signal from the second input optical signal, the second input optical signal having the same polarization as the output optical signal.

In some embodiments, the IPC includes: a polarization-side port facing the 22.5° Faraday rotator; at least one component-side port opposite the polarization-side port of the IPC; a polarization splitter rotator PSR including a first, a second, and a third port, the PSR coupled via its first port, over the polarization-side port of the IPC; a first set of waveguides coupled to the second and third ports of the PSR; a first phase shifter coupled along a first waveguide of the first set of waveguides; and a first splitter including a first set of ports and a second set of ports, the first splitter coupled to the PSR via its first set of ports and over the first set of waveguides, and coupled over at least one port of its second set of ports, via the at least one component-side port of the IPC.

In some embodiments, the first integrated polarizing device is one of a plurality of first integrated polarizing devices included in the integrated photonics system, the IPC is one of a plurality of IPCs included in the integrated photonics system, and the 22.5° Faraday rotator includes a shared 22.5° Faraday rotator for rotating polarizations of optical signals transmitted between the plurality of first integrated polarizing devices and the plurality of IPCs.

In some embodiments, the lens includes a single shared lens between the plurality of first integrated polarizing devices and the shared 22.5° Faraday rotator, and each first integrated polarizing device of the plurality of first integrated polarizing devices and each IPC of the plurality of IPCs is angled relative to a focal plane of the single shared lens and the at least one integrated chip includes curved facets proximate locations where the first integrated polarizing devices and IPCs are integrated therein.

In some embodiments, the lens, the reflector, and the 22.5° Faraday rotator are bonded together into a single lens-rotator-reflector assembly.

In some embodiments, the lens-rotator-reflector assembly is mounted on one or more of the at least one integrated chip or mounted on a common substrate on which the at least one integrated chip is mounted.

In some embodiments, the at least one Faraday rotator includes a 22.5° Faraday rotator, and the integrated photonics system further includes: a lens between the first integrated polarizing device and the 22.5° Faraday rotator; and a reflector situated on a side of the 22.5° Faraday rotator opposite the lens, for reflecting optical signals traversing the 22.5° Faraday rotator from the lens back into the 22.5° Faraday rotator towards the lens; in which the first integrated polarizing device includes an IPC for generating the first polarized optical signal with a polarization which is different from the polarization of the first input optical signal.

In some embodiments, the IPC is configured to substantially discard the rotated second polarized optical signal received by the IPC.

In some embodiments, the IPC is configured to substantially direct the rotated second polarized optical signal received by the IPC over a second component-side port of the IPC.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
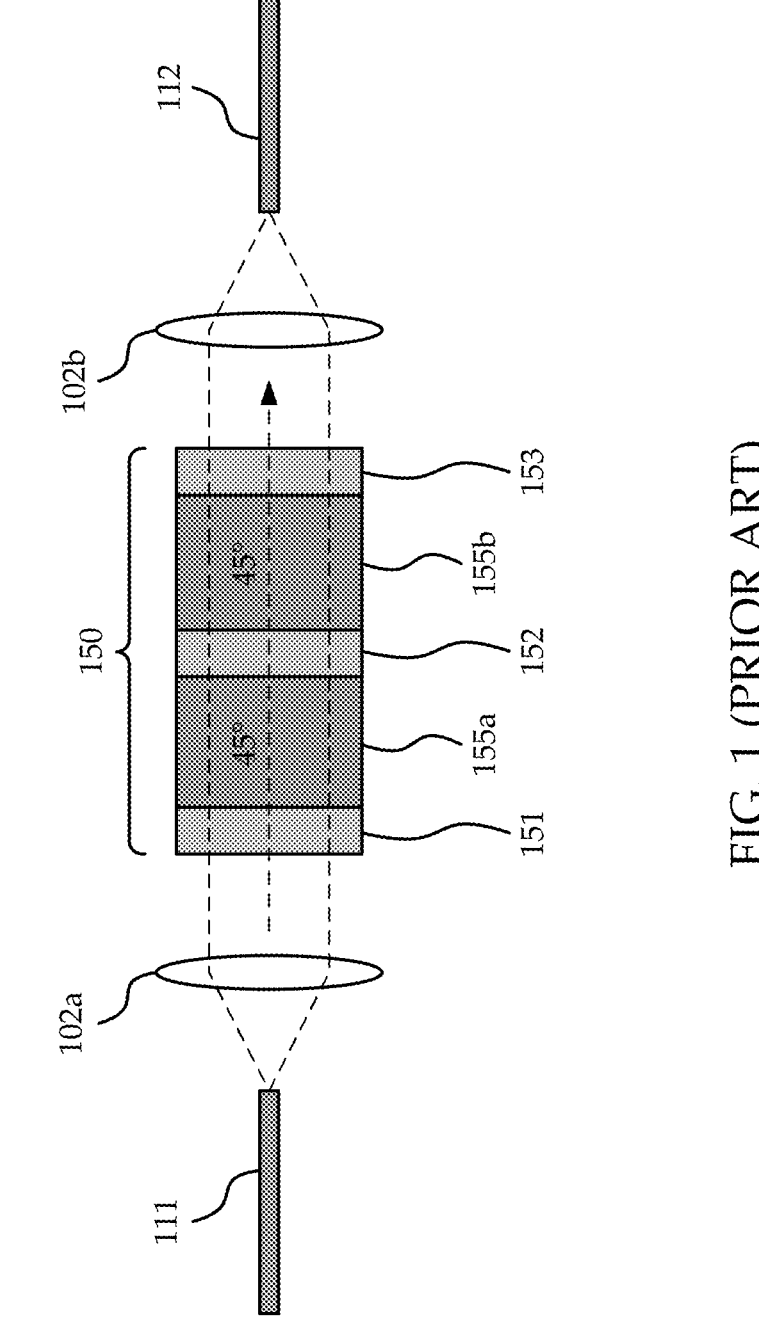
FIG. 1 is a schematic block diagram of a known fiber isolator.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

DETAILED DESCRIPTION

Photonics systems utilize a host of structural and functional elements to guide, launch, manipulate, or otherwise utilize photonic signals to their desired application. In many such systems the guiding of optical signals is implemented in the form of circulators, sometimes employing isolators. In a light detection and ranging (LIDAR) system, a 2×2 transmit/receive splitter can create a 6 dB round-trip loss. Being associated with the optical beams launched toward and received from target objects, this is not an insignificant or inconsequential loss of power. The greater the power associated with optical signals utilized in the detecting and ranging of the target objects the more accurate and potentially greater the upper range that a LIDAR instrument will have. A moderately lossy circulator (~1 dB loss per pass) would provide a link-budget improvement of 4 dB which is not insignificant. Circulators with better performance can push this improvement even higher.

Generally, circulators have required magneto-optic material, however there is no known good integration method at wafer scale. Furthermore, traditional (fiber) isolators/circulators are very large and expensive, plus they require fiber alignment. Non-magnetic isolators have been demonstrated, but with very poor loss/isolation performance.

In modern silicon photonics, integration of as much structure and function into on-chip devices has advantages over free-space elements, including optimization of size, cost, optical performance, to name but a few. Whether in LIDAR or any other photonics application, optical circulators and isolators can be complex and/or bulky, sometimes involving multiple beam-splitting cubes, large birefringent crystals or waveplates, etc. and conversion from on-chip to free-space polarization optics and back can introduce unwanted insertion loss.

The present disclosure describes on-chip solutions for optical isolators and circulators including integrated polarization controllers for converting, controlling, and utilizing polarization states of light avoiding or mitigating problems associated with optical solutions consisting only of free-space optics. Isolators and circulators are utilized in a wide range of photonics applications, many of which may benefit from the solutions disclosed herein.

With reference to FIG. 1 a known fiber isolator 100 based on a double-stage isolator design will now be discussed.

An optical signal traversing a first fiber or waveguide 111 is launched via, for example, an emitter or coupler into free-space, after which it is collimated by a first converging lens 102a. The collimated optical signal encounters a front side of a double-stage isolator 150 including a first polarizer 151 oriented at a first angle, for example, 0° from an x-axis. Almost all of the optical signal passing through the first polarizer 151 emerges polarized at 0° and thereafter passes through a first Faraday rotator 155a which subjects the polarization of the optical signal to a rotation of 45°, resulting in a mostly 45° polarized optical signal. This optical signal encounters a second polarizer 152 which is arranged to have an orientation which is 45° relative to the first polarizer 151, for example oriented at 45° from the x-axis. Almost all of the optical signal passes through the second polarizer 152, and the fraction which is not polarized at 45° is reduced further. The optical signal thereafter passes through a second Faraday rotator 155b which subjects the optical signal to a further rotation of 45°, resulting in a mostly 90° polarized optical signal. The resulting 90° polarized optical signal encounters a third polarizer 153 which is arranged to have an orientation which is 45° relative to the second polarizer 152, for example 90° from the x-axis. Almost all of the optical signal passes through the third polarizer 153, and the reduced fraction which is not polarized at 90° is reduced even further. The optical signal thereafter is focused while passing through a second converging lens 102b, then is collected at a second fiber or waveguide 112 via a coupler or emitter.

Any optical signals which traverse in the other direction, i.e. from the second fiber or waveguide 112 toward the first fiber or waveguide 111, are substantially blocked because of the operation of the Faraday rotators 155a 155b and the arrangement of the first, second, and third polarizers 151 152 153.

Any optical signal traversing the second fiber or waveguide 112 is launched into free-space, and collimated via the second converging lens 102b. The collimated optical signal encounters the double-stage isolator 150 from the back side, first interacting with the third polarizer 153 oriented at the third angle, 90°. Almost all of the optical signal passing through the third polarizer 153 emerges polarized at 90° and thereafter passes through the second Faraday rotator 155b which subjects the optical signal to a 45° rotation, resulting in a mostly 135° polarized optical signal. The resulting mostly 135° polarized optical signal encounters the second polarizer 152 which is arranged to have an orientation of 45°. Almost all of the optical signal therefore is blocked by the second polarizer 152, the polarization of that optical signal being orthogonal to the orientation of the second polarizer. Any portion of the optical signals from the second fiber or waveguide 112 originally at 0° which were not fully blocked by the third polarizer 153, gain 45° in the second Faraday rotator 155b, pass through the 45° oriented second polarizer 152 thereafter gaining a further 45° to achieve a polarization of 90° at which point it encounters the first polarizer 151 oriented at 0° and which substantially blocks this portion.

It should be understood, that the double-stage isolator and any single or multistage isolator based on a similar design, works by exploiting the known angle of rotation imparted to the polarization of an optical signal traversing a fixed length of faraday rotator, and arranging the orientations of the set of polarizers to transmit optical signals traversing in one direction along the isolator, while simultaneously blocking optical signals traversing in the opposite direction.

It should be noted that a single-stage isolator variation of the isolator of FIG. 1 utilizes only two polarizers oriented at a relative angle of 45° and spaced apart by a Faraday rotator which imparts a rotation of 45°.

It should be noted that although in principle the double-stage isolator may be oriented at any angle, only one polarization orientation will be fully transmitted in a forward direction of the isolator. Consequently, only a single polarization either along the slow or fast axis, depending upon fiber rotation, is effectively supported for transmission and isolation.

Figure 2:
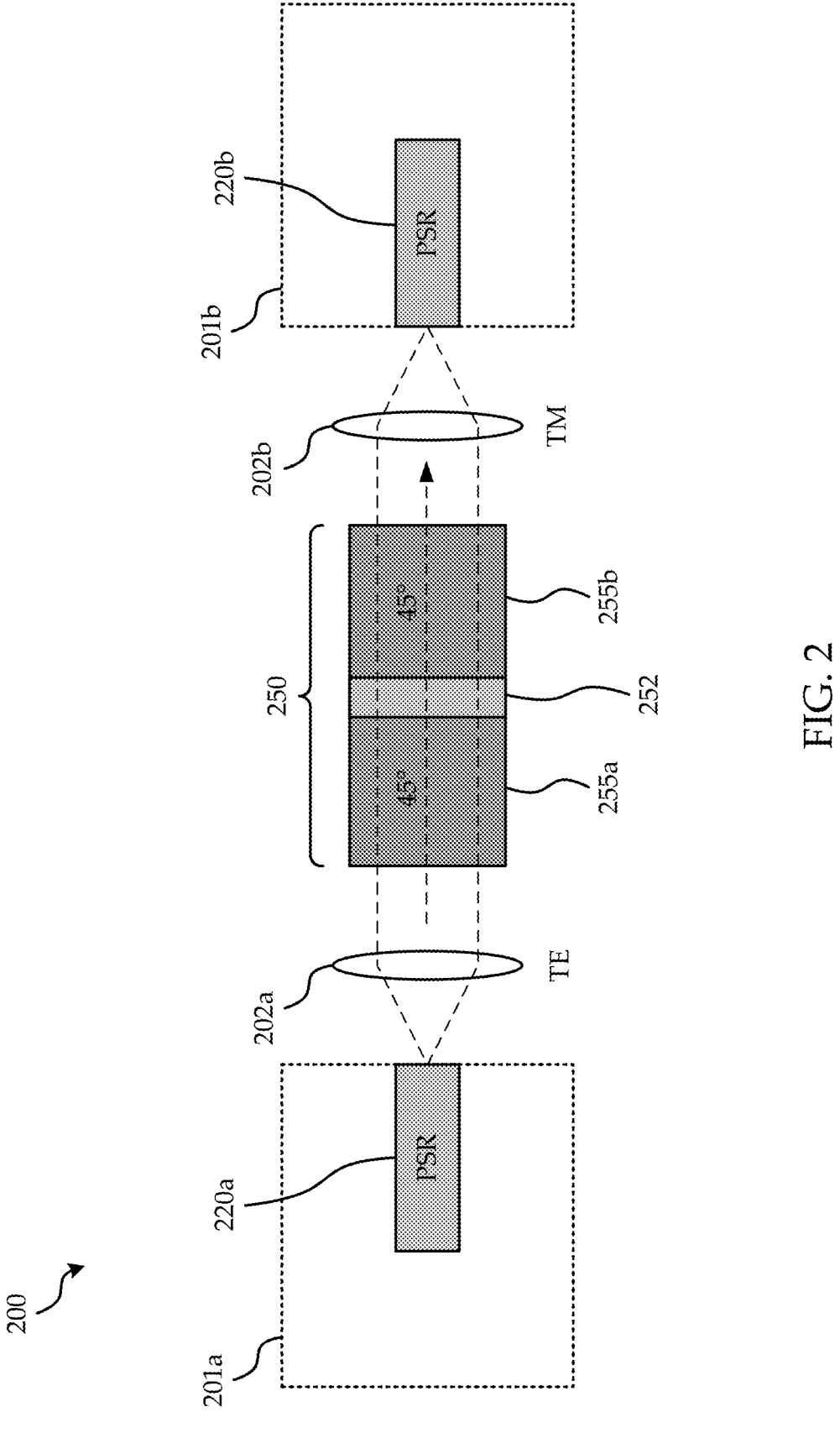
FIG. 2 is a schematic diagram of a double-stage integrated photonics isolator according to an embodiment.

To implement an isolator in an integrated context, with a view to avoiding or mitigating problems associated with optical solutions consisting of free-space components, an integrated photonics isolator 200 such as that depicted in FIG. 2 dispenses with the polarizers on the front and back of the double-stage isolator.

It should be noted that some of the optical devices, and in particular the integrated polarizing devices such as the polarization splitter rotators (PSRs) and integrated polarization controllers (IPCs) described below, can be described in the context of optical signals traversing in either direction or both directions simultaneously. In the particular context of each device where one side is characterized by polarized optical signals having both orthogonal components and the other side is characterized by components of polarized optical signals (in the form of linearly polarized signals), rather than describing any of the various device ports structurally as inputs or outputs, aspects of the devices and structure may be described as "polarization-side" or "component-side". As will become clearer hereinbelow, "polarization-side" will refer to a side or direction of the devices from which or to which polarized optical signals are received or transmitted and "component-side" will refer to a side or direction of the devices from or to which the components of the polarized optical signals (in the form of linearly polarized signals) are received or transmitted.

With respect to structure, a first integrated optical chip 201*a* (other waveguides and internal devices not shown) includes a first PSR 220*a*.

A PSR includes three ports, a single polarization-side port and first and second component-side ports. The polarization-side port and the first component-side port form a first path through the PSR, while the polarization-side port and the second component-side port form a second path through the PSR. Orthogonal components of an optical signal traversing the PSR from the polarization-side are split and output over the two separate component-side ports, one component traversing the first path without rotation, the other component traversing the second path undergoing a 90° rotation of polarization. Consequently, a PSR can be described as having an orientation defined by the direction of this preferred polarization angle, i.e. one can define a "polarization" of the first path based on the polarization of the optical component which may traverse the first path without any rotation of polarization or re-direction.

The first PSR 220*a* is coupled to the remainder of the first integrated optical chip 201*a* via its first component-side port, and coupled over its polarization-side port via, for example, an emitter or coupler (not shown) into free-space. In some embodiments, the second component-side port of the first PSR 220*a* is coupled further into the first integrated optical chip 201*a* in such a manner that optical signals emerging from the first PSR 220*a* over the second component-side port are discarded, for example, with a termination of the output achieved by tapers or doping. The first PSR 220*a* is arranged so that a polarization of its first path is oriented along, for example, the x-axis ($E_x$ or TE) direction or 0°. A first converging lens 202*a* is situated between the first integrated optical chip 201*a* and a double stage isolator 250, which includes a first Faraday rotator 255*a* for imparting a 45° rotation, coupled to a polarizer 252 oriented at 45°, which itself is coupled to a second Faraday rotator 255*b* for imparting a further 45° rotation. A second converging lens 202*b* is arranged between the double stage isolator 250 and a second integrated optical chip 201*b*, which includes a second PSR 220*b*, also coupled to free-space via an emitter or coupler (not shown). The second PSR 220*b* is coupled to the emitter or coupler via its polarization-side port and coupled to the remainder of the second integrated optical chip 201*b* via its second component-side port. The second PSR 220*b* is arranged so that a polarization of its first path is oriented along, for example, the x-axis ($E_x$ or TE) direction or 0°. In some embodiments, the first component-side port of the second PSR 220*b* is coupled further into the second integrated optical chip 201*b* in such a manner that optical signals emerging from the second PSR 220*b* over the first component-side port are discarded.

With respect to function, the first PSR 220*a* receives over a waveguide within the first integrated photonics chip 201*a* a TE optical signal over its first component-side port. The optical signal traverses the first path of the first PSR 220*a* and emerges from the first PSR 220*a* over the associated emitter or coupler to free-space. This optical signal is collimated by the first converging lens 202*a*, after which it encounters the double-stage isolator 250. The TE optical signal at 0° passes through the first Faraday rotator 255*a* which subjects the optical signal to a 450 rotation of polarization resulting in a mostly 45° polarized optical signal. This mostly 450 polarized optical signal encounters the polarizer 252 which is arranged to have an orientation which is 45° relative to the polarization resulting from the first PSR 220*a* i.e. oriented at 45°. Almost all of the optical signal passes through the polarizer 252, and any fraction which is not polarized at 45° is attenuated. The optical signal thereafter passes through the second Faraday rotator 255*b* which subjects the optical signal to a further 45° rotation of polarization resulting in a mostly 90° polarized optical signal. The resulting 90° ($E_y$ or TM) polarized optical signal leaves the double-stage isolator 250, is focused passing through the second converging lens 202*b*, and is then collected at the coupler or emitter associated with the second PSR 220*b*. The TM optical signal enters the polarization-side port of the second PSR 220*b*, traverses the second path over which it is rotated into a TE optical signal and output over the second component-side port of the second PSR 220*b* to proceed into the second integrated optical chip 201*b*.

Any TE polarized optical signals within the second integrated optical chip 201*b* which traverse in the other direction, i.e. from the second PSR 220*b* toward the first PSR 220*a* 111, are substantially blocked because of the operation of the Faraday rotators 255*a* 255*b* and the arrangement of the first and second PSRs 220*a* 220*b* and the polarizer 252.

Optical signals polarized as TE input over the second-component port and traversing the second path of the second PSR 220*b* are launched into free-space as TM signals ($E_y$ or 90°), and collimated via the second converging lens 202*b*. The collimated optical signal encounters the double-stage isolator 250 from the back side, passes through the second Faraday rotator 255*b* which subjects the optical signal to a 45° rotation of polarization resulting in a mostly 135° polarized optical signal. The resulting mostly 135° polarized optical signal encounters the polarizer 252 which is arranged to have an orientation of 45°. Almost all of the optical signal therefore is blocked by the polarizer 252, the polarization of that optical signal being orthogonal to the orientation of the polarizer. Any portion of the spurious TE optical signals from the second PSR 220*b* gain 45° in the second Faraday rotator 255*b*, pass through the 45° oriented polarizer 252 thereafter gaining a further 45° to achieve a polarization of TM (90°) at which point it encounters the first PSR 220*a*, which substantially directs this portion away from its first path, over its second path and to its second component-side port to be discarded.

Although the embodiments depicted in FIG. 2 and FIGS. 3 and 9-12 below, have been described as including a first integrated optical chip and a second integrated optical chip, it should be understood that in general, the first and second integrated optical chips may be separate integrated optical chips (which may or may not be integrated on a common substrate), or may be two portions of the same integrated optical chip, separated by for example, a depression or etched cavity formed in the integrated optical chip, in which any lens, polarizer, or Faraday rotator are situated.

Figure 3:
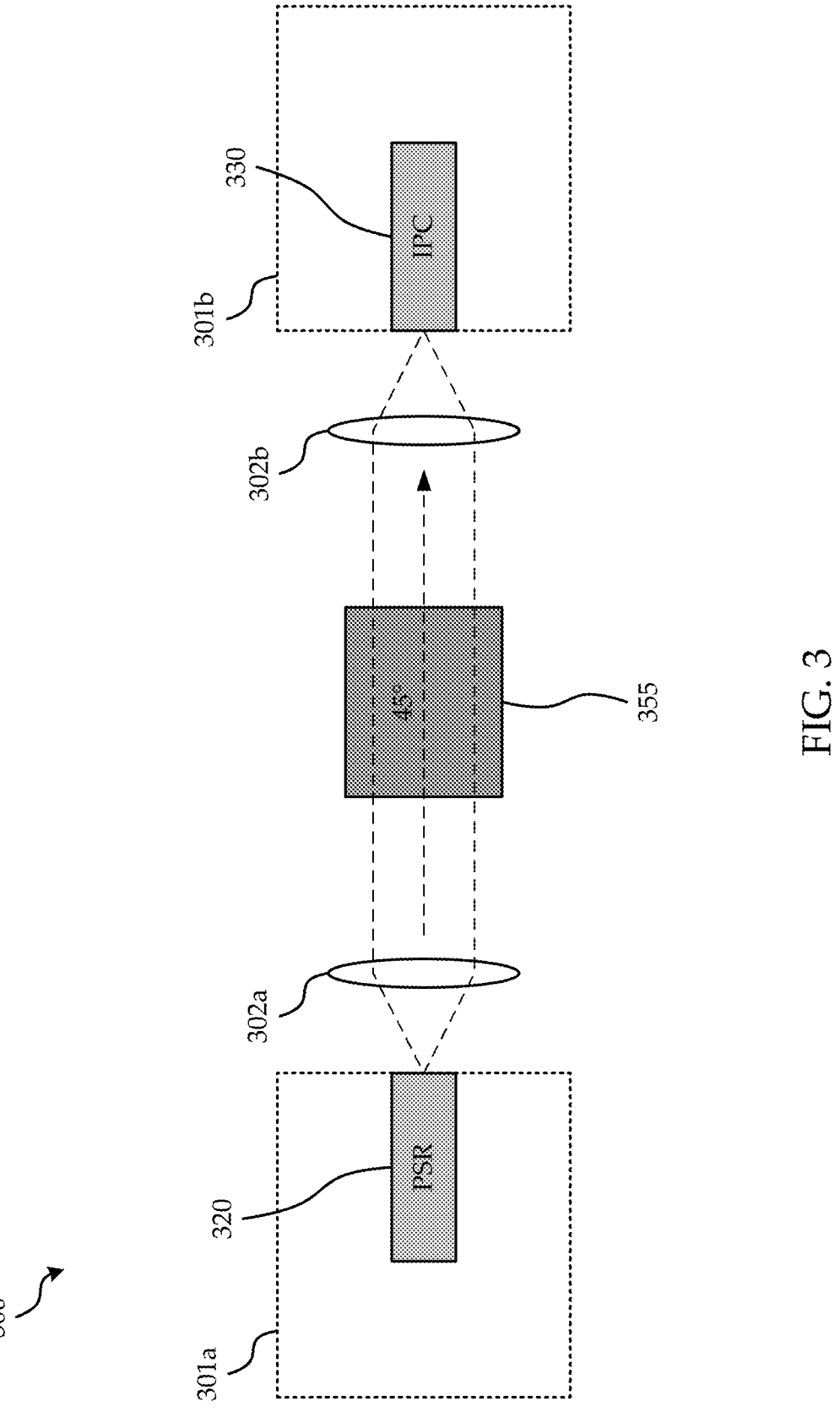
FIG. 3 is a schematic diagram of a single-stage integrated photonics isolator according to an embodiment.

To implement an isolator in an integrated context, with a view to further avoiding or mitigating problems associated with optical solutions consisting of free-space components, an integrated photonics isolator 300 such as that depicted in FIG. 3 dispenses entirely with a double-stage isolator and all polarizers, adopting a single stage faraday rotator design.

With respect to structure, a first integrated optical chip 301*a* (other waveguides and internal devices not shown) includes a polarization splitter rotator PSR 320. The PSR 320 is coupled to the remainder of the first integrated optical chip 301*a* via its first component-side port, and coupled over its polarization-side port via, for example, an emitter or coupler (not shown) into free-space. In some embodiments, the second component-side port of the PSR 320 is coupled further into the first integrated optical chip 301*a* in such a manner that optical signals emerging from the PSR 320 over the second component-side port are discarded. The PSR 320 is arranged so that a polarization of its first path is oriented, for example. along the x-axis ($E_x$ or TE) direction or 0°. A first converging lens 302*a* is situated between the first integrated optical chip 301*a* and a single stage isolator including a Faraday rotator 355 for imparting a 45° rotation. A second converging lens 302*b* is arranged between the Faraday rotator 355 and a second integrated optical chip 301*b*, which includes an integrated polarization controller (IPC) 330 such as one similar to that described in connection with FIG. 4, 5, 6, 7, or 8 below. The IPC 330 is coupled to an emitter or coupler (not shown) via its polarization-side port and coupled to the remainder of the second integrated optical chip 301*b* via one of its component-side ports.

With respect to function, the PSR 320 receives over a waveguide within the first integrated photonics chip 301*a* a TE optical signal over its first component-side port. The optical signal traverses the first path of the PSR 320 and emerges from the PSR 320 over the associated emitter or coupler to free-space. This optical signal is collimated by the first converging lens 302*a*, after which it encounters the Faraday rotator 355 of the single-stage isolator. The TE optical signal at 0° passes through the first Faraday rotator 355 which subjects the optical signal to a 45° rotation of polarization resulting in a mostly 45° polarized optical signal. The resulting mostly 450 polarized optical signal leaves the Faraday rotator 355, is focused passing through the second converging lens 302*b*, and is then collected at the coupler or emitter associated with the IPC 330. The 45° polarized optical signal enters the polarization-side port of the IPC 330, traverses the IPC 330 to emerge as a TE optical signal from one of the component-side ports of the IPC 330 to proceed into the second integrated optical chip 301*b*. As will become apparent below, the IPC 330, in order to convert the 45° polarized optical signal into TE and to perform the inverse in the opposite direction, requires a more elaborate structure than that of a known integrated PSR described above.

Any TE optical signals within the second integrated optical chip 301*b* which traverse in the other direction, i.e. towards the first integrated optical chip 301*a*, are substantially blocked because of the operation of the Faraday rotator 355 and the arrangement of the PSR 320 and IPC 330.

Optical signals polarized as TE entering the IPC 330 via the one of its component-side port are converted into a 45° polarized optical signal, launched into free-space, and collimated via the second converging lens 302*b*. The collimated optical signal encounters the Faraday rotator 355 from the back side, which subjects the 45° polarized optical signal to a rotation of polarization amounting to 45° resulting in a mostly 90° polarized optical signal. The resulting mostly 90° (TM) polarized optical signal encounters the PSR 320 which is arranged to have an orientation of polarization of 0° or TE over its first path, and hence is substantially re-directed away from the first component-side port, over its second path and to its second component-side port to be discarded.

The IPC of the isolator 300 and the further embodiments which follow, are more elaborate than a standard PSR and allow for conversion of the 45° polarized optical signals emerging from a Faraday rotator into a TE polarized optical signal. The IPCs fall into two categories, type I IPCs which can convert polarization states having components of equal magnitudes into TE, and type II IPCs which can convert polarization states of arbitrary polarization into TE.

Figure 4:
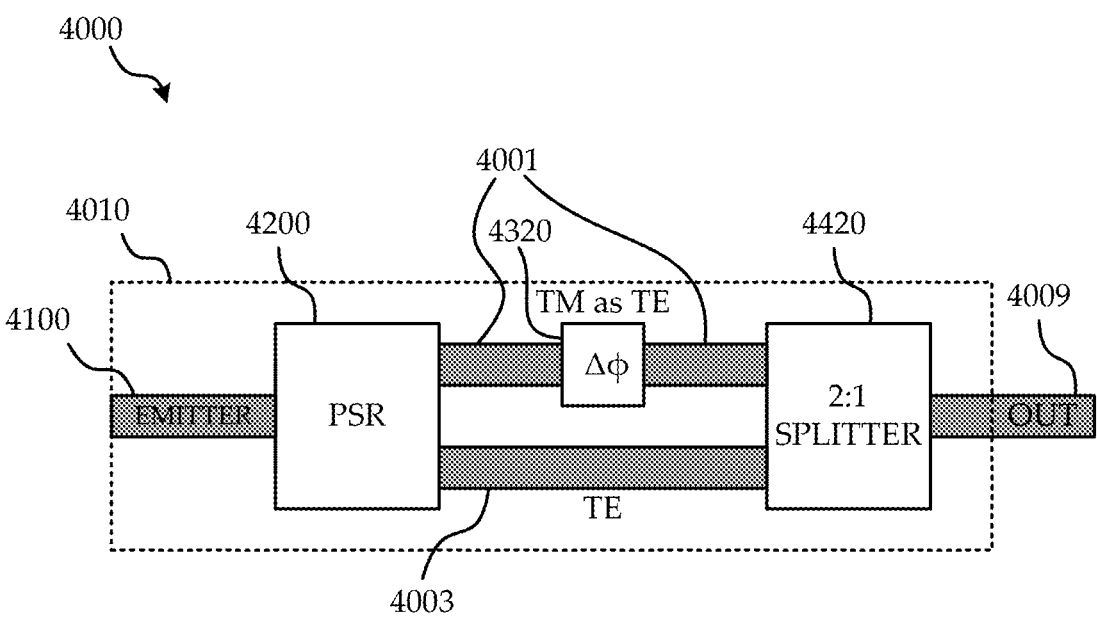
FIG. 4 is a schematic block diagram of a system including a type I integrated polarization controller (IPC) with a single component-side port according to an embodiment.

With reference to FIG. 4 a system 4000 including a type I IPC according to an embodiment will now be discussed.

The system 4000 includes an IPC 4010 including an arrangement of on-chip photonics devices for converting any polarization state with orthogonal components e.g. $E_x$ and $E_y$ (TE and TM) having equal amplitudes, into a polarization state having substantially all of the incident power in a single component direction, e.g. $E_x$ or TE. For example, an optical signal which is 45° linearly polarized (e.g. from the x-axis), either of a "diagonal" or "anti-diagonal" polarization state, right-hand circular polarized (RHCP), left-hand circular polarized (LHCP), or in any elliptical polarization state which is formed by a combination of TE and TM of equal amplitudes and out-of-phase by amounts other than ±π/2, 0, or π, may be converted into a linear polarization state e.g. TE of substantially the same power as the original optical signal. In the context of the single-stage isolator 300 and other isolator embodiments, the IPC 4010 converts 450 polarized optical signals coming from the Faraday rotator into TE and performs the reverse operation for optical signals traversing in the reverse direction. In embodiments such as the single-stage isolator 300 this effectively blocks reverse transmission when combined with the associated PSR since due to the polarization orientation of the PSR, it directs TM optical signals from the Faraday rotator to a second component-side port where it may be discarded. In embodiments such as the single-stage circulator 9000 (of FIG. 9 below) reverse transmission re-routed over the second port of the associated PSR is not discarded.

With respect to structure, starting from a polarization-side of the system 4000, a first port of an emitter 4100 serves as the polarization-side port of the IPC 4010. The emitter 4100 may be any free-space to chip converter that supports both polarization components (TE and TM), such as a grating or inverse taper, etc. A second port of the emitter 4100 is coupled to a single polarization-side port of a polarization splitter rotator (PSR) 4200 which is coupled via its component-side ports over a first set of waveguides 4001 4003 to a first set of ports on a polarization-side of a 2:1 splitter 4420. A first component-side port of the PSR is coupled to a first waveguide 4001 and a second component-side port of the PSR is coupled to a second waveguide 4003. A phase shifter 4320 is coupled along the first waveguide 4001. The first waveguide 4001 is coupled to a first port of the 2:1 splitter 4420, and the second waveguide 4003 is coupled to a second port of the 2:1 splitter 4420. A component-side of the 2:1 splitter 4420 is coupled via a second set of ports, consisting of a single third port, to a component-side port 4009 of the IPC 4010, represented here as a waveguide coupled to further optical components which utilize the polarization converted optical signal.

With respect to function, an original optical signal of the original polarization state is input to the IPC 4010 at the emitter 4100. After traversing the emitter 4100, the optical signal enters the polarization splitter rotator (PSR) 4200 which splits the orthogonal polarization components of the optical signal, rotates one of them, and outputs them on separate component-side ports. The $E_y$ component (TM) of the incoming optical signal is rotated 90° into a TE polarization, and output as a first component optical signal from a first component-side port of the PSR 4200 along the first waveguide 4001 "TM as TE". The $E_x$ component (TE) of the incoming optical signal is output as a second component optical signal from a second component-side port of the PSR 4200 along the second waveguide 4003 "TE". The TE and TM polarization components of the optical signal see different phase shifts traversing both the emitter 4100 and the PSR 4200, since generally the effective indices affecting the TM and TE components are not equal. This will be reflected in the phases of the first and second component optical signals emerging from the PSR 4200. For the purposes of the operation of the polarization controller 4010, the absolute phases of the optical signals traversing the first set of waveguides 4001 4003 do not matter, only the relative phase difference $\Delta\theta$ between the optical signal traversing the first waveguide 4001 and the optical signal traversing the second waveguide 4003 matters. This relative phase difference $\Delta\theta$ depends not only on the phase shifts caused by the emitter 4100 and PSR 4200, but also on the original phase difference between the orthogonal polarization components of the original optical signal. The first component optical signal "TM as TE" passes through the phase shifter 4320 coupled along the first waveguide 4001 which imparts a phase shift of $\Delta\phi$ in the first component optical signal. A phase shifted first component optical signal emerges from the phase shifter 4320, traverses the remainder of the first waveguide 4001 and enters the 2:1 splitter 4420 via its first port. The second component optical signal traverses the second waveguide 4003 and enters the 2:1 splitter 4420 via its second port. The 2:1 splitter 4420 effectively adds the optical signals received over its first set of ports to generate a final output optical signal output from the third port of the 2:1 splitter and over the component-side port 4009. In order to optimize the output power of the final output optical signal, the optical signals input to the 2:1 splitter should be in phase, or depending upon the internals of the 2:1 splitter 4420, have whatever phase difference optimizes power. In order to achieve this, the phase shift $\Delta\phi$ of the phase shifter 4320 is chosen appropriately. In some embodiments, for example when the 2:1 splitter is a Y-branch splitter, the phase shift $\Delta\phi$ is chosen to be an integer multiple of $27\pi$ minus the relative phase difference $\Delta\theta$, to optimize the output power. It should be noted that in some embodiments, the phase shift $\Delta\phi$ of the phase shifter 4320 is chosen to optimize other aspects of the final output optical signal, such as for example, signal strength, eye opening, and/or bit error rate of a modulated signal.

It should be noted that in some embodiments, rather than a separate emitter 4100 and PSR 4200, a single emitter of a type which also serves the function of a polarization splitter rotator is utilized. In those embodiments, the two component-side ports of that single emitter are coupled directly to the first and second waveguides 4001 4003.

It should be noted that the relative phase of the first component optical signal "TM as TE" emerging from the emitter 4100 and PSR 4200 over the first waveguide 4001 may lead or follow the phase of the second component optical signal "TE" emerging from the emitter 4100 and PSR 4200 over the second waveguide 4003.

Since only relative phase difference is relevant (rather than absolute phases), in some embodiments the phase shifter 4320 is located along the second waveguide 4003 and its phase shift $\Delta\phi$ appropriately chosen.

Although the first component optical signal traversing the first waveguide 4001 has been characterized as "TM as TE", and the second component optical signal traversing the second waveguide has been characterized as "TE", as long as the optical signals emerging from the emitter 4100 and/or PSR 4200 are in the same (parallel) linearly polarized state supported by both the first and second waveguides 4001 4003, they may be appropriately phase shifted by the phase shifter 4320 and combined in the 2:1 splitter 4420. For example, in some contexts the emitter 4100 and PSR 4200 may split and rotate the polarization components such that the $E_x$ component (TE) of the incoming optical signal is rotated 90° into a TM polarization and output as "TE as TM", and the $E_y$ component (TM) of the incoming optical signal is output as "TM", both signals traversing over waveguides 4001 4003 which support "TM" mode transmission.

In some embodiments for which the polarization of the original optical signal is known, the phase shifter 4320 is a fixed passive element.

In some embodiments, to deal with various polarization states (having orthogonal components of equal magnitude), the phase shifter 4320 is tunable and the polarization controller includes active control of the phase shifter 4320 and optionally includes various elements for power monitoring such as taps and photodiodes (similar to those described below in association with FIG. 8) to provide feedback to a controller tuning the phase shift $\Delta\phi$.

The phase shifters 4320 of this and the remaining embodiments, may be implemented using various different technologies, including but not limited to: thermo-optic, electro-optic, carrier injection, carrier depletion, liquid crystal, or MEMS. Generally, thermo-optic technology is preferred due to its low optical loss.

In some embodiments (as described below in association with FIG. 9), the IPC 4010 is simultaneously utilized in reverse (e.g. in a circulator) so that the first port of the emitter 4100 is utilized as an output of the IPC 4010 for signals incoming over the component-side port 4009. In such a case, a linearly polarized optical signal, e.g. "TE" is launched into the component-side port 4009, the signal is split and a relative phase difference $\Delta\phi$ introduced by the phase shifter 4320 such that once rotated and recombined in the PSR 4200 and emitter 4100, the optical signal emerging from the emitter 4100 has the desired polarization, such as an optical signal which is 450 linearly polarized (e.g. from the x-axis). Consequently, the phase shift $\Delta\phi$ is determined taking into account both this desired polarization state of the output and the relative phase difference $\Delta\theta$ introduced by the emitter 4100 and PSR 4200.

Generally, the IPC 4010, using a combination of an emitter 4100 and/or PSR 4200, splits two orthogonal polarization components (having the same magnitude) of an incident optical signal and rotates one to be parallel with the other, and using a phase shifter 4320, controls the relative phase of the two component optical signals, prior to combining them in a 2:1 splitter, and alternatively (or simultaneously) can also perform the reverse operation.

In some embodiments of the type I polarization controller, the 2:1 splitter can be replaced with a 2:2 splitter, for example ignoring one path, including for example multimode interferometers (MMI) or directional couplers.

Such is the case with the system 5000 including a type I IPC according to an embodiment, illustrated in FIG. 5, which will now be discussed.

The integrated photonics system 5000 includes an IPC 5010 including an arrangement of on-chip photonics devices for converting any polarization state with orthogonal components e.g. $E_x$ and $E_y$ (TE and TM) having equal amplitudes, into a polarization state having substantially all of the incident power in a single component direction, e.g. $E_x$ or TE. For example, an optical signal which is 45° linearly polarized (e.g. from the x-axis), either of a "diagonal" or "anti-diagonal" polarization state, right-hand circular polarized (RHCP), left-hand circular polarized (LHCP), or in any elliptical polarization state which is formed by a combination of TE and TM of equal amplitudes and out-of-phase by amounts other than $\pm\pi/2$, 0, or $\pi$, may be converted into a linear polarization state e.g. TE of substantially the same power as the original optical signal. In the context of the single-stage isolator 300 and other isolator embodiments, the IPC 5010 converts 45° polarized optical signals coming from the Faraday rotator into TE and performs the reverse operation for optical signals traversing in the reverse direction. In embodiments such as the single-stage isolator 300 this effectively blocks reverse transmission when combined with the associated PSR since due to the polarization orientation of the PSR, it directs TM optical signals from the Faraday rotator to a second component-side port where it may be discarded. In embodiments such as the single-stage circulator 9000 (of FIG. 9 below), reverse transmission re-routed over a second port of the associated PSR is not discarded.

Starting from a polarization-side of the system 5000, a first port of an emitter 5100 serves as the polarization-side port of the IPC 5010. The emitter 5100 may be any free-space to chip converter that supports both polarization components (TE and TM), such as a grating or inverse taper, etc. A second port of the emitter 5100 is coupled to a single polarization-side port of a polarization splitter rotator (PSR) 5200 which is coupled via its component-side ports over a first set of waveguides 5001 5003 to a first set of ports on a polarization-side of a 2:2 splitter 5420. A first component-side port of the PSR 5200 is coupled to a first waveguide 5001 and a second component-side port of the PSR 5200 is coupled to a second waveguide 5003. A phase shifter 5320 is coupled along the first waveguide 5001. The first waveguide 5001 is coupled to a first port of the 2:2 splitter 5420, and the second waveguide 5003 is coupled to a second port of the 2:2 splitter 5420. A component-side of the 2:2 splitter 5420 is coupled via a second set of ports, consisting of a third and a fourth port respectively to two component-side ports 5009a 5009b of the IPC 5010, represented here as waveguides one or both of which are coupled to further optical components which utilize the polarization converted optical signal.

An original optical signal of the original polarization state is input to the IPC 5010 at the emitter 5100. After traversing the emitter 5100, the optical signal enters the polarization splitter rotator (PSR) 5200 which splits the orthogonal polarization components of the optical signal, rotates one of them, and outputs them on separate component-side ports. The $E_y$ component (TM) of the incoming optical signal is rotated 90° into a TE polarization, and output as a first component optical signal from a first component-side port of the PSR 5200 along the first waveguide 5001 "TM as TE". The $E_x$ component (TE) of the incoming optical signal is output as a second component optical signal from a second component-side port of the PSR 5200 along the second waveguide 5003 "TE". The TE and TM polarization components of the optical signal see different phase shifts traversing both the emitter 5100 and the PSR 5200, since generally the effective indices affecting the TM and TE components are not equal. This will be reflected in the phases of the first and second component optical signals emerging from the PSR 5200. For the purposes of the operation of the polarization controller 5010, the absolute phases of the optical signals traversing the first set of waveguides 5001 5003 do not matter, only the relative phase difference $\Delta\theta$ between the optical signal traversing the first waveguide 5001 and the optical signal traversing the second waveguide 5003 matters. This relative phase difference $\Delta\theta$ depends not only on the phase shifts caused by the emitter 5100 and PSR 5200, but also on the original phase difference between the orthogonal polarization components of the original optical signal. The first component optical signal "TM as TE" passes through the phase shifter 5320 coupled along the first waveguide 5001 which imparts a phase shift of $\Delta\phi$ in the first component optical signal. A phase shifted first component optical signal emerges from the phase shifter 5320, traverses the remainder of the first waveguide 5001 and enters the 2:2 splitter 5420 via its first port. The second component optical signal traverses the second waveguide 5003 and enters the 2:2 splitter 5420 via its second port. The 2:2 splitter 5420 effectively adds the optical signals received over its first set of ports to generate a final output optical signal output from one of the ports of its second set of ports, namely one of the third or fourth ports of the 2:2 splitter 5420 and over one of the component-side ports 5009a 5009b. The other one of its third or fourth port coupled to the other one of the component-side ports 5009a 5009b produces an optical signal which is the difference between the two optical signals received over the 2:2 splitter's 5420 first set of ports. In order to optimize the output power of the final output optical signal, the optical signals input to the 2:2 splitter should be in phase, or depending upon the internals of the 2:2 splitter 5420 (and which component-side port 5009a 5009b is being used as the "output"), have whatever phase difference optimizes power emerging over the intended component-side port 5009a 5009b. For example, a 2:2 splitter 5420 may be such that even-mode input optical signals optimizes power over one of the two component-side ports 5009a 5009b while minimizing the power over the other of the two component-side ports 5009a 5009b. In such a case, that same 2:2 splitter would likely be such that odd-mode input optical signals optimizes power over the other of the two component-side ports 5009a 5009b while minimizing the power over the one of the two component-side ports 5009a 5009b. It should be noted, that although in some embodiments only one of the two component-side ports 5009a 5009b is utilized as the desired output for the final output optical signal, whereas optical signals at the other of the two component-side ports 5009a 5009b are dumped or discarded, in some embodiments, optical signals at both component-side ports 5009a 5009b are utilized, and in some cases put to different use.

In order to achieve this, a proper relative phase difference for optimizing the output power, the phase shift $\Delta\phi$ of the phase shifter 5320 is chosen appropriately. In some embodiments, the phase shift $\Delta\phi$ is chosen to be an integer multiple of 27 minus the relative phase difference $\Delta\theta$, while in other embodiments (where odd mode optimizes output) the phase shift $\Delta\phi$ is chosen to be $\pi$ minus the relative phase difference $\Delta\theta$ plus an integer multiple of $2\pi$, in order to optimize the output power. It should be noted that in some embodiments, the phase shift $\Delta\phi$ of the phase shifter 5320 is chosen to optimize other aspects of the final output optical signal, such as for example, signal strength, eye opening, and/or bit error rate of a modulated signal.

In some embodiments, rather than a separate emitter 5100 and PSR 5200, a single emitter or coupler of a type which also serves the function of a polarization splitter rotator is utilized. In those embodiments, the two component-side ports of that coupler are coupled directly to the first and second waveguides 5001 5003.

The relative phase of the first component optical signal "TM as TE" emerging from the emitter 5100 and PSR 5200 over the first waveguide 5001 may lead or follow the phase of the second component optical signal "TE" emerging from the emitter 5100 and PSR 5200 over the second waveguide 5003. In some embodiments the phase shifter 5320 is located along the second waveguide 5003 and its phase shift $\Delta\phi$ appropriately chosen.

As long as the optical signals emerging from the emitter 5100 and/or PSR 5200 are in the same (parallel) linearly polarized state supported by both the first and second waveguides 5001 5003, they may be appropriately phase shifted by the phase shifter 5320 and combined in the 2:2 splitter 5420. For example, in some contexts the emitter 5100 and PSR 5200 may split and rotate the polarization components such that the $E_x$ component (TE) of the incoming optical signal is rotated 90° into a TM polarization and output as "TE as TM", and the $E_y$ component (TM) of the incoming optical signal is output as "TM", both signals traversing over waveguides 5001 5003 which support "TM" mode transmission.

In some embodiments, for which the polarization of the original optical signal is known, the phase shifter 5320 is a fixed passive element.

In some embodiments, to deal with various polarization states (having orthogonal components of equal magnitude), the phase shifter 5320 is tunable and the polarization controller includes active control of the phase shifter 5320 and optionally includes various elements for power monitoring such as taps and photodiodes (similar to those described below in association with FIG. 8) to provide feedback to a controller tuning the phase shift $\Delta\phi$.

In some embodiments (as described below in association with FIG. 9), the IPC 5010 is simultaneously utilized in reverse (e.g. in a circulator) so that the first port of the emitter 5100 is utilized as an output of the IPC 5010 for optical signals incoming over one or more component-side ports 5009a 5009b. In such a case, a linearly polarized optical signal, e.g. "TE" is launched into one component-side port e.g. 5009a, the signal is split and a relative phase difference introduced by the phase shifter 5320 such that once rotated and recombined in the PSR 5200 and emitter 5100, the optical signal emerging from the emitter 5100 has the desired polarization, such as an optical signal which is 45° linearly polarized (e.g. from the x-axis). Consequently, the phase shift $\Delta\phi$ is determined taking into account both this desired polarization state of the output and the relative phase difference $\Delta\theta$ introduced by the emitter 5100 and PSR 5200.

The polarization controller 5010, using a combination of an emitter 5100 and/or PSR 5200, splits two orthogonal polarization components (having the same magnitude) of an incident optical signal and rotates one to be parallel with the other, and using a phase shifter 5320, controls the relative phase of the two component optical signals, prior to combining them in a 2:2 splitter, and can also perform the reverse operation, alternatively or simultaneously.

The type I polarization controllers 4010 5010 discussed above in association with FIGS. 4 and 5, although described as receiving or generating optical signals with polarization states having orthogonal components of equal magnitudes, they may be used with optical signals of other polarization states to varying degrees of loss of power in the resulting optical signals. To deal with optical signals of any polarization state, IPCs of type II, as described below, may be utilized. In cases where a PSR (e.g. PSR 320 of FIG. 3 or PSR 9020 of FIG. 9) is rotationally misaligned for whatever reason, and assuming the Faraday rotator provides the requisite 45° rotation of polarization of optical signals passing therethrough, the rotated polarized optical signal entering the IPC would not be at 45°. In such a case an IPC of type II would be capable of rotating the non-45° polarized optical signal to the desired polarization of, for example, TE.

Figures 6, 7:
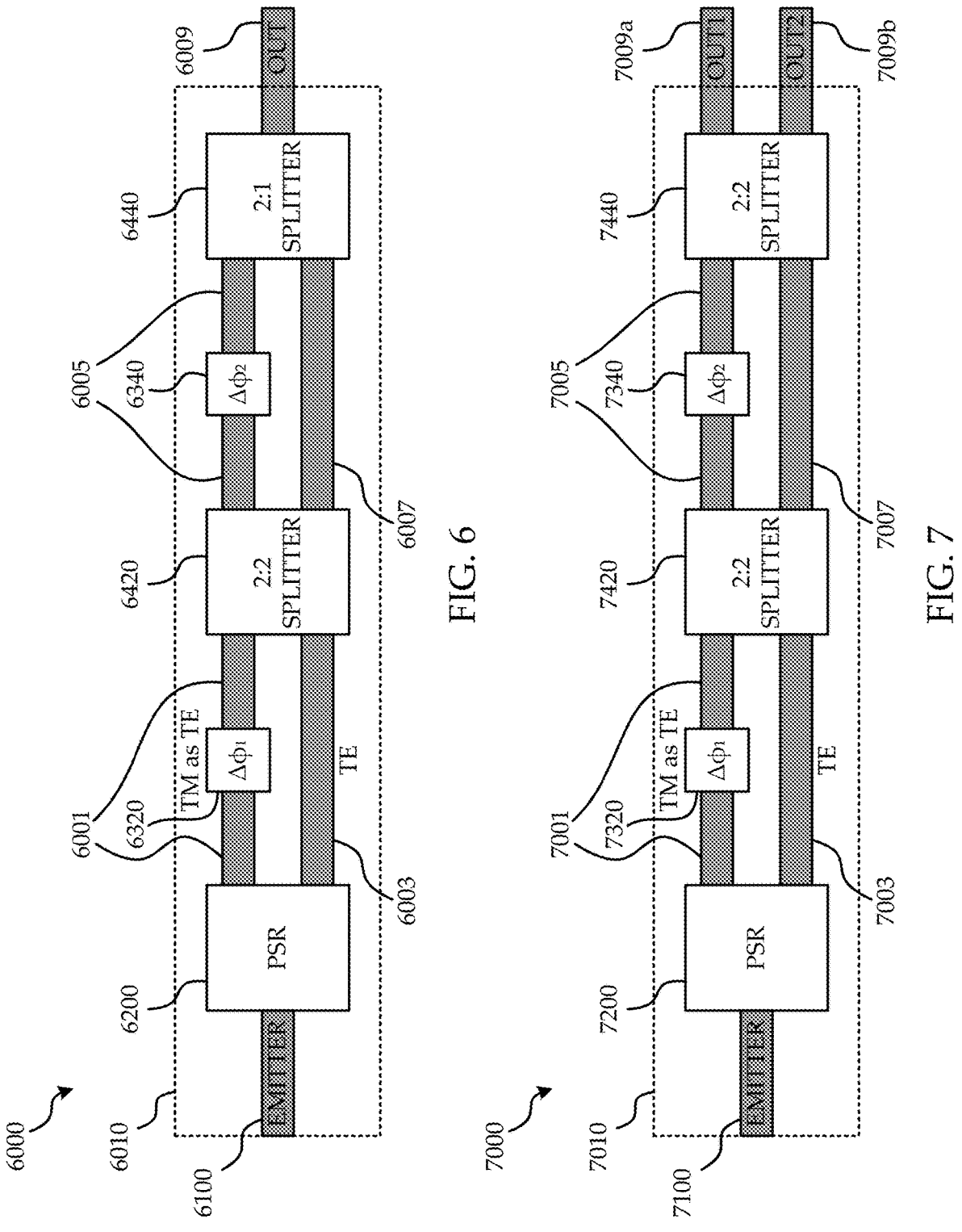
FIG. 6 is a schematic block diagram of a system including a type II IPC with a single component-side port according to an embodiment.
FIG. 7 is a schematic block diagram of a system including a type II IPC with two component-side ports according to an embodiment.

With reference to FIG. 6 a system 6000 including a type II IPC according to an embodiment will now be discussed.

Figure 5:
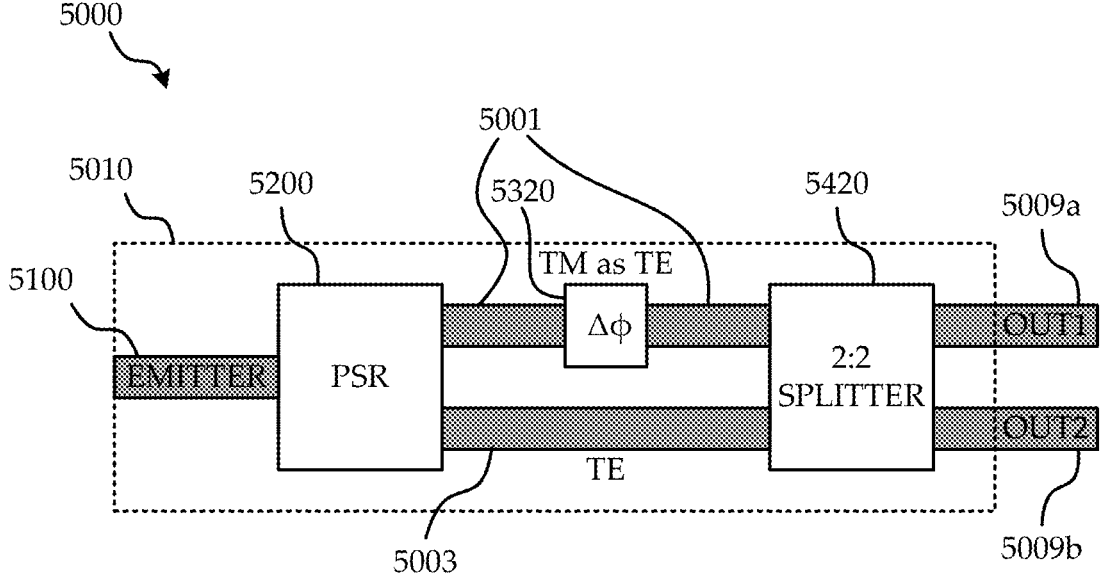
FIG. 5 is a schematic block diagram of a system including a type I IPC with two component-side ports according to an embodiment.

As was noted above in the description of the embodiments of FIGS. 4 and 5, the 2:1 splitter and the 2:2 splitter effectively add the first and second component optical signals they receive to generate the output optical signal, and generally in-phase inputs of similar magnitude optimizes output power over the component-side port of the polarization controller used as its output. If either the phases or the magnitudes are mismatched output power will not be optimized. This is why a polarization controller of type I is optimally used with optical signals having polarization components of equal magnitude. In order to allow operation with any polarization state, for which the polarization components are of any phase difference and having any ratio of magnitudes, rather than a single 2:1 splitter or 2:2 splitter, a variable splitter is utilized at the output of the polarization controller.

The system 6000 includes an IPC 6010 including an arrangement of on-chip photonics devices for converting any polarization state with orthogonal components e.g. $E_x$ and $E_y$ (TE and TM) having arbitrary amplitudes, into a polarization state having substantially all of the incident power in a single component direction, e.g. $E_x$ or TE. For example, an optical signal which is linearly, circularly, or elliptically polarized may be converted into a specific linear polarization state e.g. TE of substantially the same power as the original optical signal. In the context of the single-stage isolator 300 and other isolator embodiments, the IPC 6010 converts 450 polarized optical signals coming from the Faraday rotator into TE and performs the reverse operation for optical signals traversing in the reverse direction. In embodiments such as the single-stage isolator 300 this effectively blocks reverse transmission when combined with the associated PSR due to the polarization orientation of the PSR, it directs TM optical signals from the Faraday rotator to a second component-side port where it may be discarded. In embodiments such as the single-stage circulator 9000 (of FIG. 9 below), reverse transmission re-routed over a second port of the associated PSR is not discarded.

Starting from a polarization-side of the system 6000, a first port of an emitter 6100 serves as the polarization-side port of the IPC 6010. The emitter 6100 may be any free-space to chip converter that supports both polarization components (TE and TM), such as a grating or inverse taper, etc. A second port of the emitter 6100 is coupled to a single polarization-side port of a polarization splitter rotator (PSR)

6200 which is coupled via its component-side ports over a first set of waveguides 6001 6003 to a first set of ports on a polarization-side of a 2:2 splitter 6420. A first component-side port of the PSR 6200 is coupled to a first waveguide 6001 and a second component-side port of the PSR 6200 is coupled to a second waveguide 6003. A first phase shifter 6320 is coupled along the first waveguide 6001. The first waveguide 6001 is coupled to a first port of the 2:2 splitter 6420, and the second waveguide 6003 is coupled to a second port of the 2:2 splitter 6420. A component-side of the 2:2 splitter 6420 is coupled via a second set of ports, consisting of a third and a fourth port, over a second set of waveguides 6005 6007 to a first set of ports on a polarization-side of a 2:1 splitter 6440. The 2:2 splitter 6420 is coupled via its third port to a third waveguide 6005 and is coupled via its fourth port to a fourth waveguide 6007. A second phase shifter 6340 is coupled along the third waveguide 6005. The third waveguide 6005 is coupled to a first port of the 2:1 splitter 6440, and the fourth waveguide 6007 is coupled to a second port of the 2:1 splitter 6440. A component-side of the 2:1 splitter 6440 is coupled via a second set of ports, consisting of a single third port, to a component-side port 6009 of the IPC 6010, represented here as a waveguide coupled to further optical components which utilize the polarization converted optical signal.

An original optical signal of the original polarization state is input to the IPC 6010 at the emitter 6100. After traversing the emitter 6100, the optical signal enters the polarization splitter rotator (PSR) 6200 which splits the orthogonal polarization components of the optical signal, rotates one of them, and outputs them on separate component-side ports. The $E_y$ component (TM) of the incoming optical signal is rotated 90° into a TE polarization, and output as a first component optical signal from a first component-side port of the PSR 6200 along the first waveguide 6001 "TM as TE". The $E_x$ component (TE) of the incoming optical signal is output as a second component optical signal from a second component-side port of the PSR 6200 along the second waveguide 6003 "TE". The TE and TM polarization components of the optical signal see different phase shifts traversing both the emitter 6100 and the PSR 6200, since generally the effective indices affecting the TM and TE components are not equal. This will be reflected in the phases of the first and second component optical signals emerging from the PSR 6200. For the purposes of the operation of the polarization controller 6010, the absolute phases of the optical signals traversing the first set of waveguides 6001 6003 do not matter, only the relative phase difference $\Delta\theta$ between the optical signal traversing the first waveguide 6001 and the optical signal traversing the second waveguide 6003 matters. This relative phase difference $\Delta\theta$ depends not only on the phase shifts caused by the emitter 6100 and PSR 6200, but also on the original phase difference between the orthogonal polarization components of the original optical signal. The first component optical signal "TM as TE" passes through the first phase shifter 6320 coupled along the first waveguide 6001 which imparts a first phase shift of $\Delta\phi_1$ in the first component optical signal. A phase shifted first component optical signal emerges from the first phase shifter 6320, traverses the remainder of the first waveguide 6001 and enters the 2:2 splitter 6420 via its first port. The second component optical signal traverses the second waveguide 6003 and enters the 2:2 splitter 6420 via its second port. The 2:2 splitter 6420 effectively adds the optical signals received over its first set of ports to generate an optical signal output from one of the ports of its second set of ports, the other port of its second set of ports producing an optical signal which is the difference between the two optical signals received over the first set of ports of the 2:2 splitter 6420. In order to ensure an equal power for the optical signals arriving at the 2:1 splitter 6440, the optical signals input to the 2:2 splitter 6420, regardless of their relative powers, should be ±90° (±π/2) out of phase, or depending upon the internals of the 2:2 splitter 6420, have whatever phase difference equalizes power of the signals emerging over the second set of waveguides 6005 and 6007. This ensures that the two optical signals emerging from the 2:2 splitter 6420, namely, one being the sum of the optical signals input to the 2:2 splitter 6420 and the other being the difference of the optical signals input to the 2:2 splitter 6420, have the same power.

In order to achieve this proper relative phase difference for equalizing the output power from the 2:2 splitter 6420, the first phase shift $\Delta\phi_1$ of the first phase shifter 6320 is chosen appropriately, namely, chosen to provide a relative phase difference of ±90° (±π/2). In some embodiments, the first phase shift $\Delta\phi_1$ is chosen to be an integer multiple of 2π minus the relative phase difference $\Delta\theta$ shifted by an additional ±90° (±π/2).

Third and fourth component optical signals, of equal power, emerge from the 2:2 splitter 6420 over the third and fourth waveguides 6005 6007 respectively. The third and fourth component optical signals launched from the 2:2 splitter 6420 onto the third and fourth waveguides 6005 6007 will have a relative phase difference $\Delta\theta_2$ depending upon the relative magnitudes of the optical signals input to the 2:2 splitter 6420. The third component optical signal traversing the third waveguide 6005 passes through the second phase shifter 6340 coupled along the third waveguide 6005 which imparts a second phase shift of $\Delta\phi_2$ in the third component optical signal. A phase shifted third component optical signal emerges from the phase shifter 6340, traverses the remainder of the third waveguide 6005 and enters the 2:1 splitter 6440 via its first port. The fourth component optical signal traverses the fourth waveguide 6007 and enters the 2:1 splitter 6440 via its second port. The 2:1 splitter 6440 effectively adds the optical signals received over its first set of ports to generate a final output optical signal output from the third port of the 2:1 splitter 6440 and over the component-side port 6009. In order to optimize the output power of the final output optical signal, the optical signals input to the 2:1 splitter 6440 should be in phase, or depending upon the internals of the 2:1 splitter 6440, have whatever phase difference optimizes power. In order to achieve this, the second phase shift $\Delta\phi_2$ of the second phase shifter 6340 is chosen appropriately, and in some embodiments the second phase shift $\Delta\phi_2$ is chosen to be an integer multiple of 2π minus the second relative phase difference $\Delta\theta_2$, to optimize the output power. It should be noted that in some embodiments, the second phase shift $\Delta\phi_2$ of the second phase shifter 6340 is chosen to optimize other aspects of the final output optical signal, such as for example, signal strength, eye opening, and/or bit error rate of a modulated signal.

In some embodiments, rather than a separate emitter 6100 and PSR 6200, a single emitter of a type which also serves the function of a polarization splitter rotator is utilized. In those embodiments, the two component-side ports of that single emitter are coupled directly to the first and second waveguides 6001 6003. The relative phase of the first component optical signal "TM as TE" emerging from the emitter 6100 and PSR 6200 over the first waveguide 6001 may lead or follow the phase of the second component optical signal "TE" emerging from the emitter 6100 and PSR 6200 over the second waveguide 6003. In some embodiments one or both of the first and second phase shifters 6320 6340 are respectively located along the second and fourth waveguides 6003 6007 and their phase shifts $\Delta\phi_1$ $\Delta\phi_2$ appropriately chosen.

As long as the optical signals emerging from the emitter 6100 and/or PSR 6200 are in the same (parallel) linearly polarized state supported by both the first and second waveguides 6001 6003, they may be appropriately phase shifted by the first phase shifter 6320 and operated upon by the remaining elements of the polarization controller 6010. For example, in some contexts the emitter 6100 and PSR 6200 may split and rotate the polarization components such that the $E_x$ component (TE) of the incoming optical signal is rotated 90° into a TM polarization and output as "TE as TM", and the $E_y$ component (TM) of the incoming optical signal is output as "TM", both signals traversing over waveguides 6001 6003 which support "TM" mode transmission.

In some embodiments, for which the polarization of the original optical signal is known, the phase shifters 6320 6340 are fixed passive elements.

In some embodiments, to deal with arbitrary polarization states, the phase shifters 6320 6340 are tunable and the polarization controller includes active control of the phase shifters 6320 6340 and optionally includes various elements for power monitoring such as taps and photodiodes (similar to those described below in association with FIG. 8) to provide feedback to a controller tuning the phase shifts $\Delta\phi_1$ $\Delta\phi_2$.

In some embodiments (as described below in association with FIG. 9), the IPC 6010 is simultaneously utilized in reverse (e.g. in a circulator) so that the first port of the emitter 6100 is utilized as an output of the IPC 6010 for optical signals incoming over the component-side port 6009. In such a case, a linearly polarized optical signal, e.g. "TE" is launched into the component-side port 6009, the signal is split and a relative phase difference $\Delta\phi_2$ introduced by the second phase shifter 6340, such that once split by the 2:2 splitter 6420 and a further relative phase difference $\Delta\phi_1$ introduced by the first phase shifter 6320, and once rotated and recombined in the PSR 6200 and emitter 6100, the optical signal emerging from the emitter 6100 has the desired polarization, such as an optical signal which is 45° linearly polarized (e.g. from the x-axis). Consequently, the phase shifts $\Delta\phi_1$ $\Delta\phi_2$ are determined taking into account both this desired polarization state of the output and the relative phase difference $\Delta\theta$ introduced by the emitter 6100 and PSR 6200.

Generally, the polarization controller 6010, using a combination of an emitter 6100 and/or PSR 6200, splits two orthogonal polarization components of an arbitrarily polarized incident optical signal and rotates one to be parallel with the other, and using a first phase shifter 6320, controls the relative phase of the two component optical signals so that they possess a relative phase difference of 90° ($\pm\pi/2$) prior to traversing a 2:2 splitter 6420, from which optical signals emerge having equal power, one of which is further phase shifted using a second phase shifter 6340 by a phase shift of $\Delta\phi_2$ in order to bring them in-phase, prior to combining them in a 2:1 splitter 6440 for output, and can also (alternatively or simultaneously) perform the reverse operation.

In some embodiments of the type II polarization controller, the 2:1 splitter can be replaced with a component-side 2:2 splitter (for example ignoring one output), including for example multimode interferometers (MMI) or directional couplers.

Such is the case with the system 7000 including a type II IPC according to an embodiment, illustrated in FIG. 7, which will now be discussed.

The system 7000 includes an IPC 7010 including an arrangement of on-chip photonics devices for converting any polarization state with orthogonal components e.g. $E_x$ and $E_y$ (TE and TM) having arbitrary amplitudes, into a polarization state having substantially all of the incident power in a single component direction, e.g. $E_x$ or TE. For example, an optical signal which is linearly, circularly, or elliptically polarized may be converted into a specific linear polarization state e.g. TE of substantially the same power as the original optical signal. In the context of the single-stage isolator 300 and other isolator embodiments, the IPC 7010 converts 45° polarized optical signals coming from the Faraday rotator into TE and performs the reverse operation for optical signals traversing in the reverse direction. In embodiments such as the single-stage isolator 300 this effectively blocks reverse transmission when combined with the associated PSR since due to the polarization orientation of the PSR, it directs TM optical signals from the Faraday rotator to a second component-side port where it may be discarded. In embodiments such as the single-stage circulator 9000 (of FIG. 9 below), reverse transmission re-routed over a second port of the associated PSR is not discarded.

Starting from a polarization-side of the system 7000, a first port of an emitter 7100 serves as the polarization-side port of the IPC 7010. The emitter 7100 may be any free-space to chip converter that supports both polarization components (TE and TM), such as a grating or inverse taper, etc. A second port of the emitter 7100 is coupled to a single polarization-side port of a polarization splitter rotator (PSR) 7200 which is coupled via its component-side ports over a first set of waveguides 7001 7003 to a first set of ports on a polarization-side of a polarization-side 2:2 splitter 7420. A first component-side port of the PSR 7200 is coupled to a first waveguide 7001 and a second component-side port of the PSR 7200 is coupled to a second waveguide 7003. A first phase shifter 7320 is coupled along the first waveguide 7001. The first waveguide 7001 is coupled to a first port of the polarization-side 2:2 splitter 7420, and the second waveguide 7003 is coupled to a second port of the polarization-side 2:2 splitter 7420. A component-side of the polarization-side 2:2 splitter 7420 is coupled via a second set of ports, consisting of a third and a fourth port, over a second set of waveguides 7005 7007 to a first set of ports on a polarization-side of a component-side 2:2 splitter 7440. The polarization-side 2:2 splitter 7420 is coupled via its third port to a third waveguide 7005 and is coupled via its fourth port to a fourth waveguide 7007. A second phase shifter 7340 is coupled along the third waveguide 7005. The third waveguide 7005 is coupled to a first port of the component-side 2:2 splitter 7440, and the fourth waveguide 7007 is coupled to a second port of the component-side 2:2 splitter 7440. A component-side of the component-side 2:2 splitter 7440 is coupled via a second set of ports, consisting of a third and a fourth port respectively to two component-side ports 7009a 7009b of the IPC 7010, represented here as waveguides, one or both of which are coupled to further optical components which utilize the polarization converted optical signal.

An original optical signal of the original polarization state is input to the IPC 7010 at the emitter 7100. After traversing the emitter 7100, the optical signal enters the polarization splitter rotator (PSR) 7200 which splits the orthogonal polarization components of the optical signal, rotates one of them, and outputs them on separate component-side ports. The $E_y$ component (TM) of the incoming optical signal is rotated 90° into a TE polarization, and output as a first component optical signal from a first component-side port of the PSR 7200 along the first waveguide 7001 "TM as TE". The $E_x$ component (TE) of the incoming optical signal is output as a second component optical signal from a second component-side port of the PSR 7200 along the second waveguide 7003 "TE". The TE and TM polarization components of the optical signal see different phase shifts traversing both the emitter 7100 and the PSR 7200, since generally the effective indices affecting the TM and TE components are not equal. This will be reflected in the phases of the first and second component optical signals emerging from the PSR 7200. For the purposes of the operation of the polarization controller 7010, the absolute phases of the optical signals traversing the first set of waveguides 7001 7003 do not matter, only the relative phase difference $\Delta\theta$ between the optical signal traversing the first waveguide 7001 and the optical signal traversing the second waveguide 7003 matters. This relative phase difference $\Delta\theta$ depends not only on the phase shifts caused by the emitter 7100 and PSR 7200, but also on the original phase difference between the orthogonal polarization components of the original optical signal. The first component optical signal "TM as TE" passes through the first phase shifter 7320 coupled along the first waveguide 7001 which imparts a first phase shift of $\Delta\phi_1$ in the first component optical signal. A phase shifted first component optical signal emerges from the first phase shifter 7320, traverses the remainder of the first waveguide 7001 and enters the polarization-side 2:2 splitter 7420 via its first port. The second component optical signal traverses the second waveguide 7003 and enters the polarization-side 2:2 splitter 7420 via its second port. The 2:2 splitter 7420 effectively adds the optical signals received over its first set of ports to generate an optical signal output from one of the ports of its second set of ports, the other port of its second set of ports producing an optical signal which is the difference between the two optical signals received over the first set of ports of the polarization-side 2:2 splitter 7420. In order to ensure an equal power for the optical signals arriving at the component-side 2:2 splitter 7440, the optical signals input to the polarization-side 2:2 splitter 7420, regardless of their relative powers, should be ±90° (±π/2) out of phase, or depending upon the internals of the 2:2 splitter 7420, have whatever phase difference equalizes power of the signals emerging over the second set of waveguides 7005 and 7007. This ensures that the two optical signals emerging from the polarization-side 2:2 splitter 7420, namely, one being the sum of the optical signals input to the polarization-side 2:2 splitter 7420 and the other being the difference of the optical signals input to the polarization-side 2:2 splitter 7420, have the same power.

In order to achieve this a proper relative phase difference for equalizing the output power from the polarization-side 2:2 splitter 7420, the first phase shift $\Delta\phi_1$ of the first phase shifter 7320 is chosen appropriately, namely, chosen to provide a relative phase difference of 90° (±π/2). In some embodiments, the first phase shift $\Delta\pi_1$ is chosen to be an integer multiple of 2π minus the relative phase difference $\Delta\theta$ shifted by an additional ±90° (±π/2).

Third and fourth component optical signals, of equal power, emerge from the polarization-side 2:2 splitter 7420 over the third and fourth waveguides 7005 7007 respectively. The third and fourth component optical signals launched from the polarization-side 2:2 splitter 7420 onto the third and fourth waveguides 7005 7007 will have a relative phase difference $\Delta\theta_2$ depending upon the relative magnitudes of the optical signals input to the polarization-side 2:2 splitter 7420. The third component optical signal traversing the third waveguide 7005 passes through the second phase shifter 7340 coupled along the third waveguide 7005 which imparts a second phase shift of $\Delta\phi_2$ in the third component optical signal. A phase shifted third component optical signal emerges from the phase shifter 7340, traverses the remainder of the third waveguide 7005 and enters the component-side 2:2 splitter 7440 via its first port. The fourth component optical signal traverses the fourth waveguide 7007 and enters the component-side 2:2 splitter 7440 via its second port. The component-side 2:2 splitter 7440 effectively adds the optical signals received over its first set of ports to generate a final output optical signal output from one of the ports of its second set of ports, namely one of the third or fourth ports of the component-side 2:2 splitter 7440 and over one of the component-side ports 7009a 7009b. The other one of its third or fourth port coupled to the other one of the component-side ports 7009a 7009b produces an optical signal which is the difference between the two optical signals received over the component-side 2:2 splitter's 7440 first set of ports.

In order to optimize the output power of the final output optical signal, the optical signals input to the component-side 2:2 splitter 7440 should be in phase, or depending upon the internals of the component-side 2:2 splitter 7440, have whatever phase difference optimizes power. In order to achieve this, the second phase shift $\Delta\phi_2$ of the second phase shifter 7340 is chosen appropriately, and in some embodiments the second phase shift $\Delta\phi_2$ is chosen to be an integer multiple of 2π minus the second relative phase difference $\Delta\theta_2$, to optimize the output power. It should be noted that in some embodiments, the second phase shift $\Delta\phi_2$ of the phase shifter 7340 is chosen to optimize other aspects of the final output optical signal, such as for example, signal strength, eye opening, and/or bit error rate of a modulated signal.

In some embodiments, rather than a separate emitter 7100 and PSR 7200, a single emitter of a type which also serves the function of a polarization splitter rotator is utilized. In those embodiments, the two component-side ports of that single emitter are coupled directly to the first and second waveguides 7001 7003. The relative phase of the first component optical signal "TM as TE" emerging from the emitter 7100 and PSR 7200 over the first waveguide 7001 may lead or follow the phase of the second component optical signal "TE" emerging from the emitter 7100 and PSR 7200 over the second waveguide 7003. In some embodiments one or both of the first and second phase shifters 7320 7340 are respectively located along the second and fourth waveguides 7003 7007 and their phase shifts $\Delta\phi_1$ $\Delta\phi_2$ appropriately chosen.

As long as the optical signals emerging from the emitter 7100 and/or PSR 7200 are in the same (parallel) linearly polarized state supported by both the first and second waveguides 7001 7003, they may be appropriately phase shifted by the first phase shifter 7320 and operated upon by the remaining elements of the polarization controller 7010. For example, in some contexts the emitter 7100 and PSR 7200 may split and rotate the polarization components such that the $E_x$ component (TE) of the incoming optical signal is rotated 90° into a TM polarization and output as "TE as TM", and the $E_y$ component (TM) of the incoming optical signal is output as "TM", both signals traversing over waveguides 7001 7003 which support "TM" mode transmission.

In some embodiments, for which the polarization of the original optical signal is known, the phase shifters 7320 7340 are fixed passive elements.

In some embodiments, to deal with arbitrary polarization states, the phase shifters 7320 7340 are tunable and the polarization controller includes active control of the phase shifters 7320 7340 and optionally includes various elements for power monitoring such as taps and photodiodes (similar to those described below in association with FIG. 8) to provide feedback to a controller tuning the phase shifts $\Delta\phi_1$ $\Delta\phi_2$.

In some embodiments (as described below in association with FIG. 9), the IPC 7010 is simultaneously utilized in reverse (e.g. in a circulator) so that the first port of the emitter 7100 is utilized as an output of the IPC 7010 for optical signals incoming over one or more of the component-side ports 7009a 7009b. In such a case, a linearly polarized optical signal, e.g. "TE" is launched into one component-side port e.g. 7009a, the signal is split and a relative phase difference $\Delta\phi_2$ introduced by the second phase shifter 7340, such that once split by the polarization-side 2:2 splitter 7420 and after a further relative phase difference $\Delta\phi_1$ introduced by the first phase shifter 7320, is such that once rotated and recombined in the PSR 7200 and emitter 7100, the optical signal emerging from the emitter 7100 has the desired polarization, such as an optical signal which is 45° linearly polarized (e.g. from the x-axis). Consequently, the phase shifts $\Delta\phi_1$ $\Delta\phi_2$ are determined taking into account both this desired polarization state of the output and the relative phase difference $\Delta\theta$ introduced by the emitter 7100 and PSR 7200.

Generally, the polarization controller 7010, using a combination of an emitter 7100 and/or PSR 7200, splits two orthogonal polarization components of an arbitrarily polarized incident optical signal and rotates one to be parallel with the other, and using a first phase shifter 7320, controls the relative phase of the two component optical signals so that they possess a relative phase difference of ±90° (±π/2) prior to traversing a polarization-side 2:2 splitter 7420, from which optical signals emerge having equal power, one of which is further phase shifted using a second phase shifter 7340 by a phase shift of $\Delta\phi_2$ in order to bring them in-phase or otherwise to have a relative phase which optimizes power, prior to combining them in the component-side 2:2 splitter 7440 for output, and can also perform the reverse operation.

Figure 8:
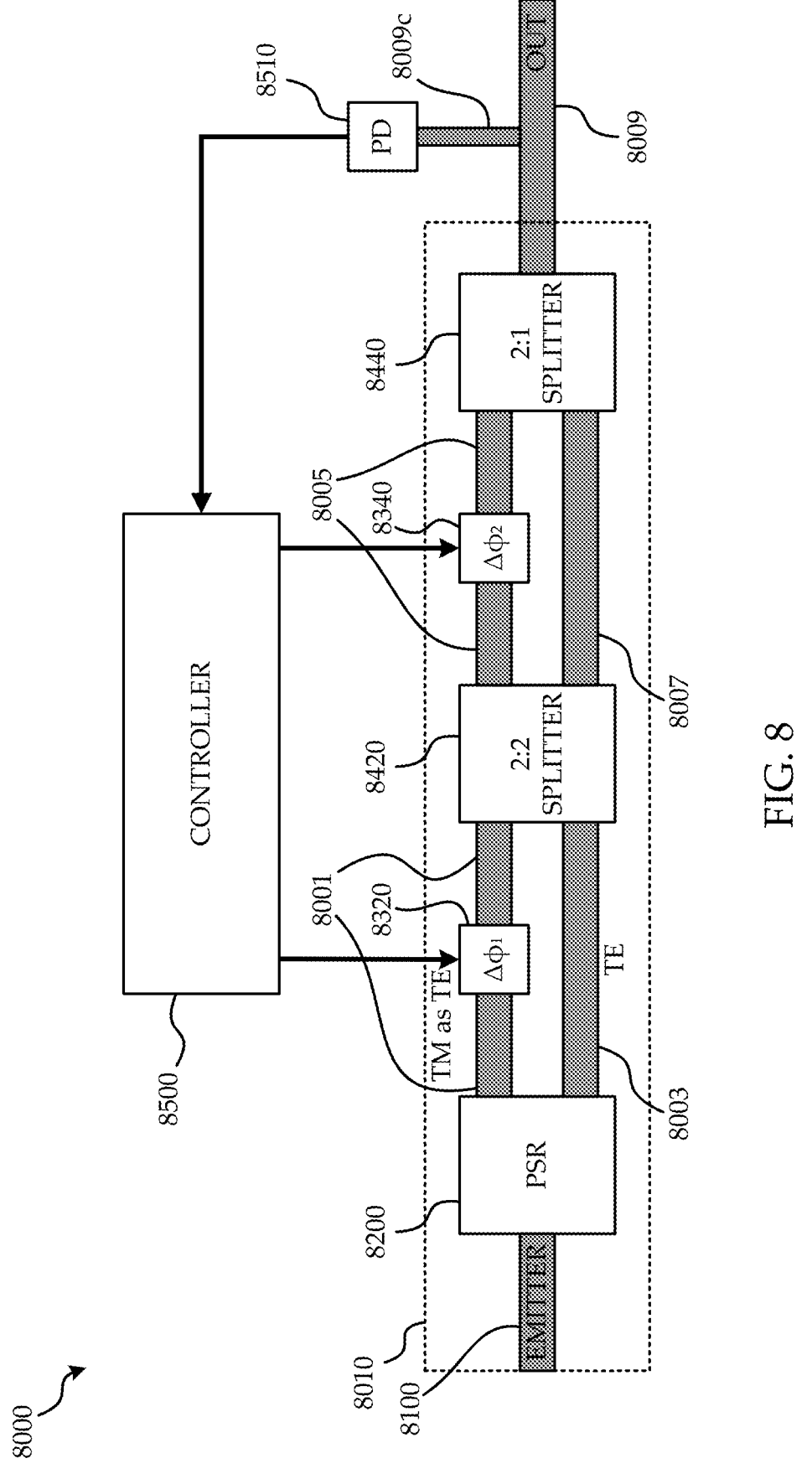
FIG. 8 is a schematic block diagram of a system including a controllable type II IPC with a single component-side port and feedback according to an embodiment.

With reference to FIG. 8, a system 8000 including a type II IPC 8010 such as that illustrated in FIG. 6, which is controllable based on feedback according to an embodiment will now be described.

Type II IPCs such as those illustrated in FIGS. 6 and 7 are well suited for dealing with optical signals of any arbitrary polarization state. However, in the context of receiving an optical signal whose polarization state is not precisely known or may shift, the phase shifts provided by the first and second phase shifters should be adjusted in response to the polarization of the original optical signal. In order to achieve this, some form of detection and feedback control should be implemented.

Starting from a polarization-side of the system 8000, a first port of an emitter 8100, serves as the polarization-side port of the IPC 8010, and receives an original optical signal from, for example, free-space. The emitter 8100 may be any free-space to chip converter that supports both polarization components (TE and TM), such as a grating or inverse taper, etc. A second port of the emitter 8100 is coupled to a single polarization-side port of a polarization splitter rotator (PSR) 8200 which is coupled via its component-side ports over a first set of waveguides 8001 8003 to a first set of ports on a polarization-side of a 2:2 splitter 8420. A first component-side port of the PSR 8200 is coupled to a first waveguide 8001 and a second component-side port of the PSR 8200 is coupled to a second waveguide 8003. A first tunable phase shifter 8320 is coupled along the first waveguide 8001. The first waveguide 8001 is coupled to a first port of the 2:2 splitter 8420, and the second waveguide 8003 is coupled to a second port of the 2:2 splitter 8420. A component-side of the 2:2 splitter 8420 is coupled via a second set of ports, consisting of a third and a fourth port, over a second set of waveguides 8005 8007 to a first set of ports on a polarization-side of a 2:1 splitter 8440. The 2:2 splitter 8420 is coupled via its third port to a third waveguide 8005 and is coupled via its fourth port to a fourth waveguide 8007. A second tunable phase shifter 8340 is coupled along the third waveguide 8005. The third waveguide 8005 is coupled to a first port of the 2:1 splitter 8440, and the fourth waveguide 8007 is coupled to a second port of the 2:1 splitter 8440. A component-side port of the 2:1 splitter 8440 is coupled to a component-side port 8009 of the IPC 8010 which acts as its output, and is represented here as a waveguide coupled to further optical components which utilize the polarization converted optical signal. An optical tap 8009c is coupled to the component-side port 8009 of the IPC 8010. A light detecting element such as a photodiode 8510 is coupled to the tap 8009c. The photodiode 8510 is electrically coupled to a controller 8500 which is itself electrically coupled to the first and second tunable phase shifters 8320 8340.

The IPC 8010 of FIG. 8 functions in a substantially similar way to the embodiment illustrated in FIG. 6, however additional elements provide detection, feedback, and control to optimize power. The optical tap 8009c coupled to the component-side port 8009 of the IPC 8010, is for tapping a small amount of the output optical signal (e.g. 1%). The photodiode 8510 is for measuring an intensity and hence a power of the output optical signal traversing the output over the component-side port 8009 using the light received over the tap 8009c. The controller 8500 receives electrical signals from the photodiode 8510 indicative of the amount of light measured. In response to this measurement, the controller 8500 determines what the first and second phase shifts imparted by the first and second phase shifters 8320 8340 should be, or by how much either or both should be adjusted. The controller 8500 then sends electrical control signals to the first and second phase shifters 8320 8340 to adjust one or both of them appropriately. The control loop can be used in a systematic way to search out and find the optimal settings for the first and second phase shifters 8320 8340 when the original optical signal's polarization state is not precisely known, and can also be used to make minor or continuous adjustments to the first and second phase shifters 8320 8340 as the polarization state of the original optical signal drifts, shifts, or otherwise changes slowly.

In a similar manner, an IPC functioning in a substantially similar way to the embodiment illustrated in FIG. 7, may be provided with detection, feedback, and control to optimize power. In the variation of the IPC of FIG. 7 in a similar manner as illustrated in FIG. 8, taps and photodiodes may be employed at one or both component-side ports 7009a 7009b. In some cases the optical signal emerging from one of the component-side ports is not intended for further use other than to deduce the attributes of the optical signal emerging from the other component-side port. In such an embodiment, for example, the power of the optical signal emerging over one component-side port 7009a 7009b is indicative of the power of the optical signal emerging over the other port component-side port 7009a 7009b. Utilizing two detection elements to monitor power and/or phase can provide more information for improved control of the first and second phase shifters 7320 7340.

It also should be noted that additional taps and photodiodes may be provided along the first, second, third and fourth waveguides (e.g. 8001, 8003, 8005, and 8007 in FIG. 8) for additional power monitoring, enabling more efficient and/or more accurate adjustment of the control loop. For example, monitoring for equal power emerging over the second set of waveguides 8005, 8007 can be used directly to adjust the first phase shifter 8320.

In the context of the isolator and circulator embodiments herein, although in theory the PSRs, Faraday rotators, and reflectors, which interact with the optical signal prior to its encountering the IPC, generate an original optical signal with a known polarization, there are various fabrication imperfections and variances which can cause this polarization to deviate from the desired or expected state. Additionally, physical changes within the device over time or in response to environmental variations, for example in ambient temperature, may cause shifts in the polarization of the optical signal as it enters the IPC. In a coordinate fashion, when used in the reverse direction, the polarization state of the optical signal emerging from the IPC toward the Faraday rotator may need to be shifted to accomplish the desired function. In embodiments such as the single-stage isolator 300 one or both of the first and second phase shifters 8320 8340 can be adjusted to optimize blocking of reverse transmission, optimize power of forward transmission, or optimize the ratio of the forward transmission power to reverse transmission power. In embodiments such as the single-stage circulator 9000 (of FIG. 9 below) one or both of the first and second phase shifters 8320 8340 can be adjusted to optimize forward and reverse transmission power.

It should be understood that feedback, controlling, and driving circuitry, such as that illustrated in FIG. 8, may comprise processors, memory, interfaces, and/or other components which are either external to or implemented in the same integrated platform as the IPC, including for example, being integrated within the same substrate or die, being integrated or co-located on a common substrate or platform, or being electrically and/or optically coupled across multiple platforms including the IPC in a same or across multiple devices.

Figure 9:
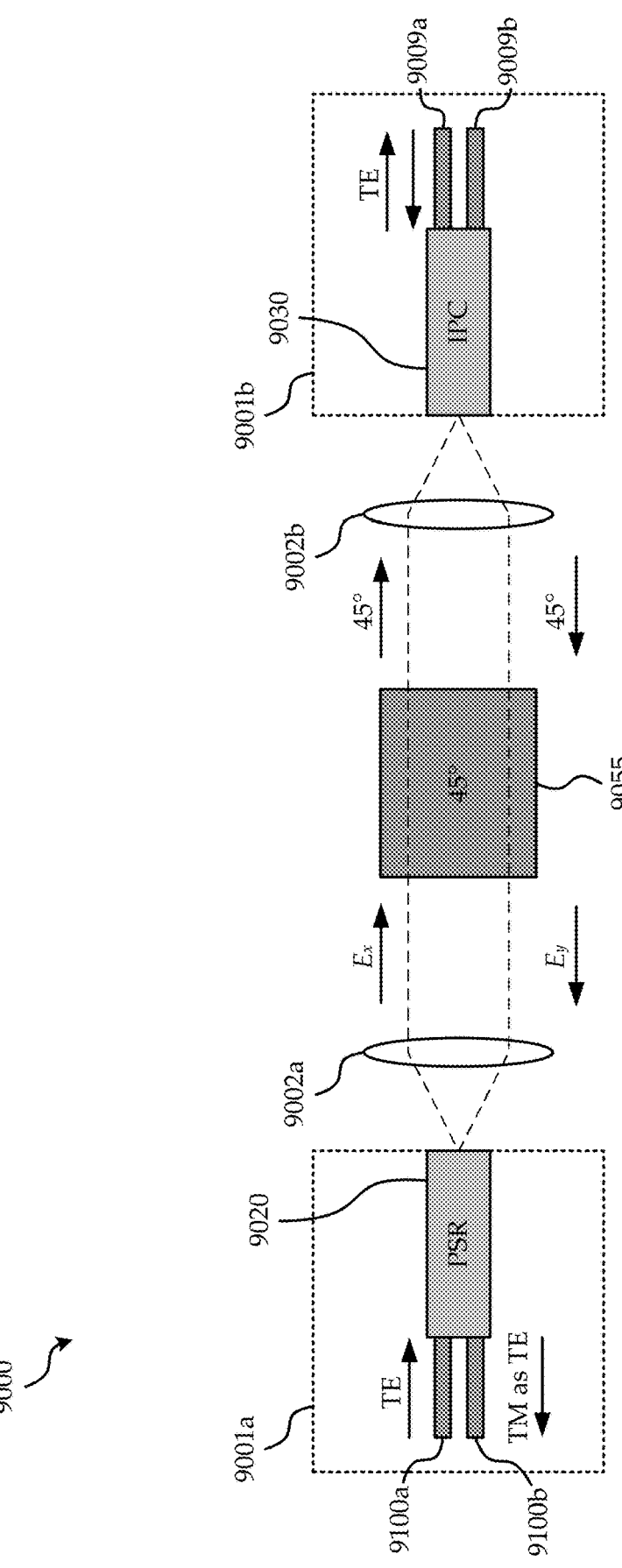
FIG. 9 is a schematic diagram of a single-stage integrated photonics circulator incorporating an IPC according to an embodiment.

With reference now to FIG. 9 an integrated photonics circulator 9000 based on a single-stage isolator design similar to that depicted in FIG. 3 will now be discussed. The integrated photonics circulator 9000 also dispenses entirely with a double-stage isolator and all polarizers, including only a single-stage faraday rotator, but in order for the device to function as a circulator, utilizes both component-side ports of the PSR rather than discarding one of them as in the embodiment of FIG. 3.

With respect to structure, a first integrated optical chip 9001a (other waveguides and internal devices not shown) includes a polarization splitter rotator PSR 9020.

The PSR 9020 is coupled to the remainder of the first integrated optical chip 9001a over two optical paths via its two component-side ports 9100a 9100b, and coupled over its polarization-side port, via an emitter or coupler (not shown) into free-space. The PSR 9020 is oriented so that a polarization of its first path is along the x-axis ($E_x$ or TE) direction or 0°. A first converging lens 9002a is situated between the first integrated optical chip 9001a and a single stage isolator including a Faraday rotator 9055 for imparting a 45° rotation. A second converging lens 9002b is arranged between the Faraday rotator 9055 and a second integrated optical chip 9001b, which includes an integrated polarization controller (IPC) 9030 such as one similar to that described in connection with FIG. 4, 5, 6, 7, or 8 above. The IPC 9030 is coupled to an emitter or coupler (not shown) via its polarization-side port and coupled to the remainder of the second integrated optical chip 9001b via one of its component-side ports such as port 9009a.

In FIG. 9 an IPC 9030 with two component-side ports is shown, and in a three port circulator variation, its second component-side output port 9009b is not used for circulating optical signals, but may be used for monitoring or may be uncoupled and/or otherwise terminated. In a four port circulator variation, the second component-side output port 9009b may be used for input and output of optical signals.

It should be understood that IPC 9030 may be similar to one described in association with FIG. 4, 6, or 8, having only one component-side port corresponding to 9009a, in which case the integrated circulator 9000 would still function in substantially the same way as the three-port circulator described below.

With respect to function, the PSR 9020 receives over a waveguide within the first integrated photonics chip 9001a an optical signal (TE) over its first component-side port. The optical signal traverses the first path of the PSR 9020 and emerges from the PSR 9020 as a TE optical signal over the associated emitter or coupler to free-space. This optical signal ($E_x$) is collimated by the first converging lens 9002a, after which it encounters the Faraday rotator 9055 of the single-stage isolator. The optical signal at 0° passes through the first Faraday rotator 9055 which subjects the optical signal to a 45° rotation of polarization, resulting in a mostly 450 polarized optical signal. The resulting mostly 45° polarized optical signal leaves the Faraday rotator 9055, is focused passing through the second converging lens 9002b, and is then collected at the coupler or emitter associated with the IPC 9030. The 45° polarized optical signal enters the polarization-side port of the IPC 9030, traverses the IPC 9030 to emerge as a TE optical signal from the first component-side port 9009a of the IPC 9030 to proceed into the second integrated optical chip 9001b.

Optical signals within the second integrated optical chip 9001b, generally being of a TE polarization, which traverse in the other direction, i.e. towards the first integrated optical chip 9001a, are re-routed because of the operation of the Faraday rotator 9055 and the arrangement of the PSR 9020.

Optical signals polarized as TE entering the IPC 9030 via its component-side port 9009a are converted into a 45° polarized optical signal, launched into free-space, and collimated via the second converging lens 9002b. The collimated optical signal encounters the Faraday rotator 9055 from the back side, which subjects the optical signal to a 45° rotation of polarization, resulting in a mostly 90° polarized optical signal. The resulting mostly 90° ($E_y$ or TM) polarized optical signal encounters the PSR 9020 which is arranged to have its first path orientated at 0° (or for TE), and therefore the TM optical signals received over its polarization-side port are re-routed over its second component-side port 9100b after being rotated 90°, emerging as a TE optical signal.

In a three-port circulator variation, optical signals polarized as TE entering the PSR 9020 via its second component-side port 9100b are converted into a TM (90° or $E_y$) polarized optical signal, launched into free-space, and collimated via the first converging lens 9002a. The collimated optical signal encounters the Faraday rotator 9055 from the front side, which subjects the optical signal to a 45° rotation of polarization, resulting in a mostly 135° polarized optical signal. Since the IPC is arranged to have 45° polarized optical signals emerge as TE over its first component-side port 9009a, this resulting mostly 135° polarized optical signal which encounters the IPC 9030 is re-routed over its second component-side port 9009b where it is discarded.

In a four-port circulator variation, TE optical signals entering any of the four ports are forwarded out another port rather than discarded.

In the four-port circulator variation, optical signals polarized as TE entering the PSR 9020 via its second component-side port 9100b are converted into a TM (90° or $E_y$) polarized optical signal, launched into free-space, and collimated via the first converging lens 9002a. The collimated optical signal encounters the Faraday rotator 9055 from the front side, which subjects the optical signal to a 45° rotation of polarization, resulting in a mostly 135° polarized optical signal. Since the IPC is arranged to have 45° polarized optical signals emerge as TE over its first component-side port 9009a, this resulting mostly 135° polarized optical signal which encounters the IPC 9030 is re-routed over its second component-side port 9009b to emerge as TE.

In the four-port circulator variation, optical signals polarized as TE entering the IPC 9030 via its second component-side port 9009b are converted into a 135° polarized optical signal, launched into free-space, and collimated via the second converging lens 9002b. The collimated optical signal encounters the Faraday rotator 9055 from the back side, which subjects the optical signal to a 45° rotation of polarization, resulting in a mostly 180° (i.e. 0°) polarized optical signal. The resulting mostly 0° ($E_x$ or TE) polarized optical signal encounters the PSR 9020 which is arranged to have its first path orientated at 0° (or for TE), and therefore the TE optical signal received over its polarization-side port is forwarded over its first component-side port 9100a, emerging as a TE optical signal.

It should be understood from the foregoing that in general, the integrated circulator 9000 of FIG. 9 may be used as a three-port or a four-port circulator.

Figure 10:
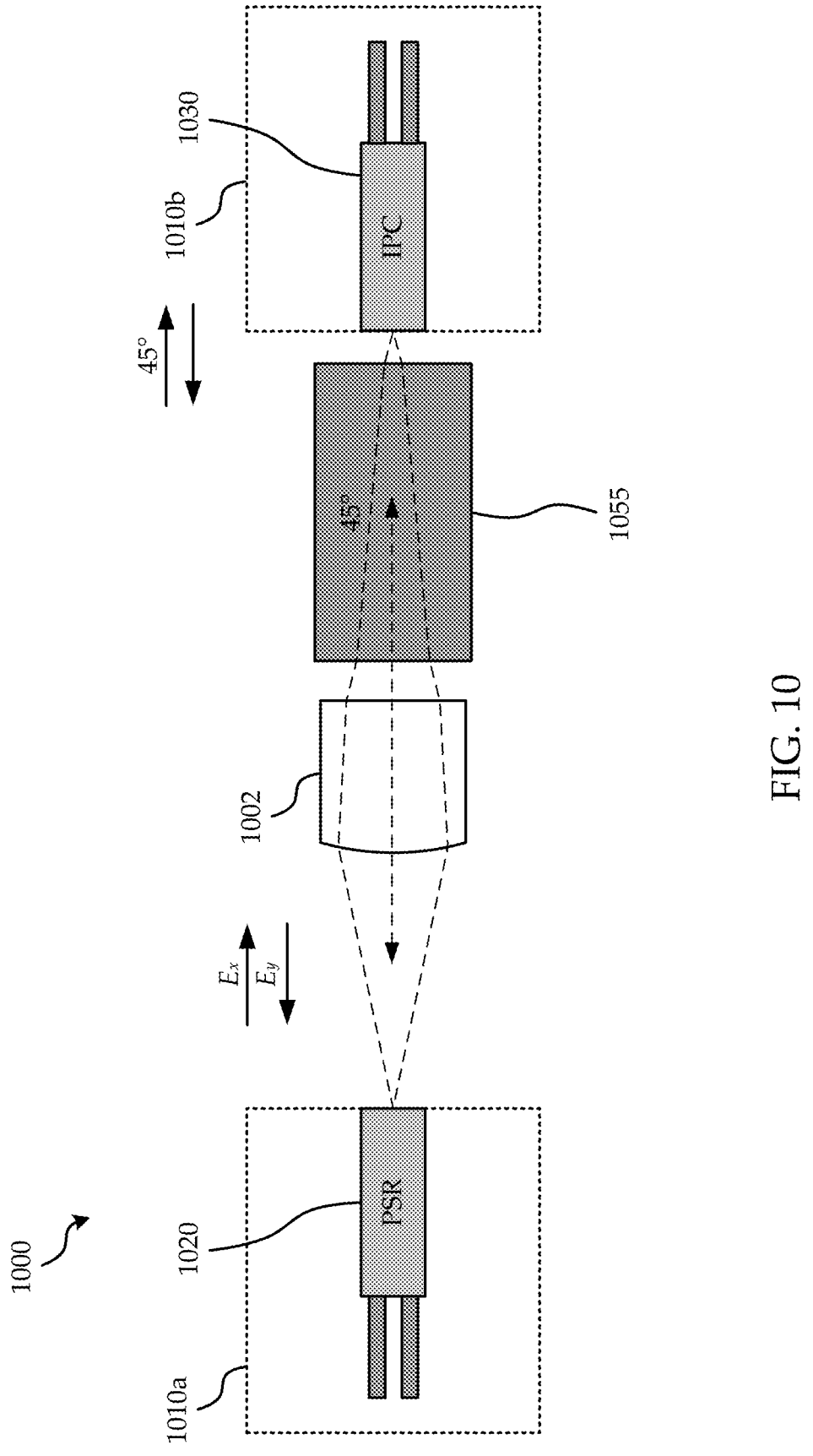
FIG. 10 is a schematic diagram of a single-stage, single-lens, integrated photonics circulator or isolator device incorporating an IPC according to an embodiment.

In some embodiments, an integrated isolator or circulator similar to that described in FIGS. 3 and 9 are implemented without the second converging lens. Such an integrated isolator or circulator device 1000 is illustrated in FIG. 10. The device 1000 of FIG. 10 is structured and functions similarly to the embodiments of FIGS. 3 and 9.

It should be noted that the device 1000, and those of the remaining embodiments illustrated in FIGS. 10-16 may be implemented as three or four port circulators or as isolators depending upon whether only one or both component-side ports of the PSRs (and IPCs) are utilized. In embodiments for which both component-side ports of the PSRs are utilized, the device can be implemented as a circulator, and in embodiments for which only one component-side port of the PSRs are utilized, the device can be implemented as an isolator.

It should be noted that in FIGS. 10-16 the IPCs are illustrated with two component-side ports for example only, and it should be understood that both types of IPC, those having a single component-side port such as in IPCs of FIGS. 4 and 6 or having two component-side ports such as the IPCs of FIGS. 5 and 7, are contemplated. It also should be noted that all IPCs and all PSRs are aligned such that their polarization-side port faces the Faraday rotator.

As with the embodiments described hereinabove, the device 1000 includes a first integrated optical chip 1010a which includes a PSR 1020. To compensate for the absent second lens, a single silicon aspherical converging lens 1002 may be used between the first integrated optical chip 1010a and the Faraday rotator (45°) 1055 to focus optical signals therebetween into the polarization-side port of the PSR 1020 and the emitter or coupler of the IPC 1030. Materials other than silicon may be used for the aspheric converging lens 1002 such as glass or fused silica. It should be noted that although the converging lens of this and other disclosed embodiments are described as aspherical, lenses with simple spherical surfaces may be used with some additional wavefront error and thus coupling loss to the relevant PSR or IPC. In general, it is preferable for the converging lens 1002 to be of a high index of refraction. Optical signals from the Faraday rotator proceed to an IPC 1030 (type I or type II) of the second integrated optical chip 1010b. Lens tolerances may be compensated for with alignment and in some embodiments the converging lens 1002 is provided with active alignment to maximize coupling to the IPC 1030. Utilizing the single lens can reduce the footprint which in one implementation of the device totals just 2.1 mm×0.3 mm.

Figure 11:
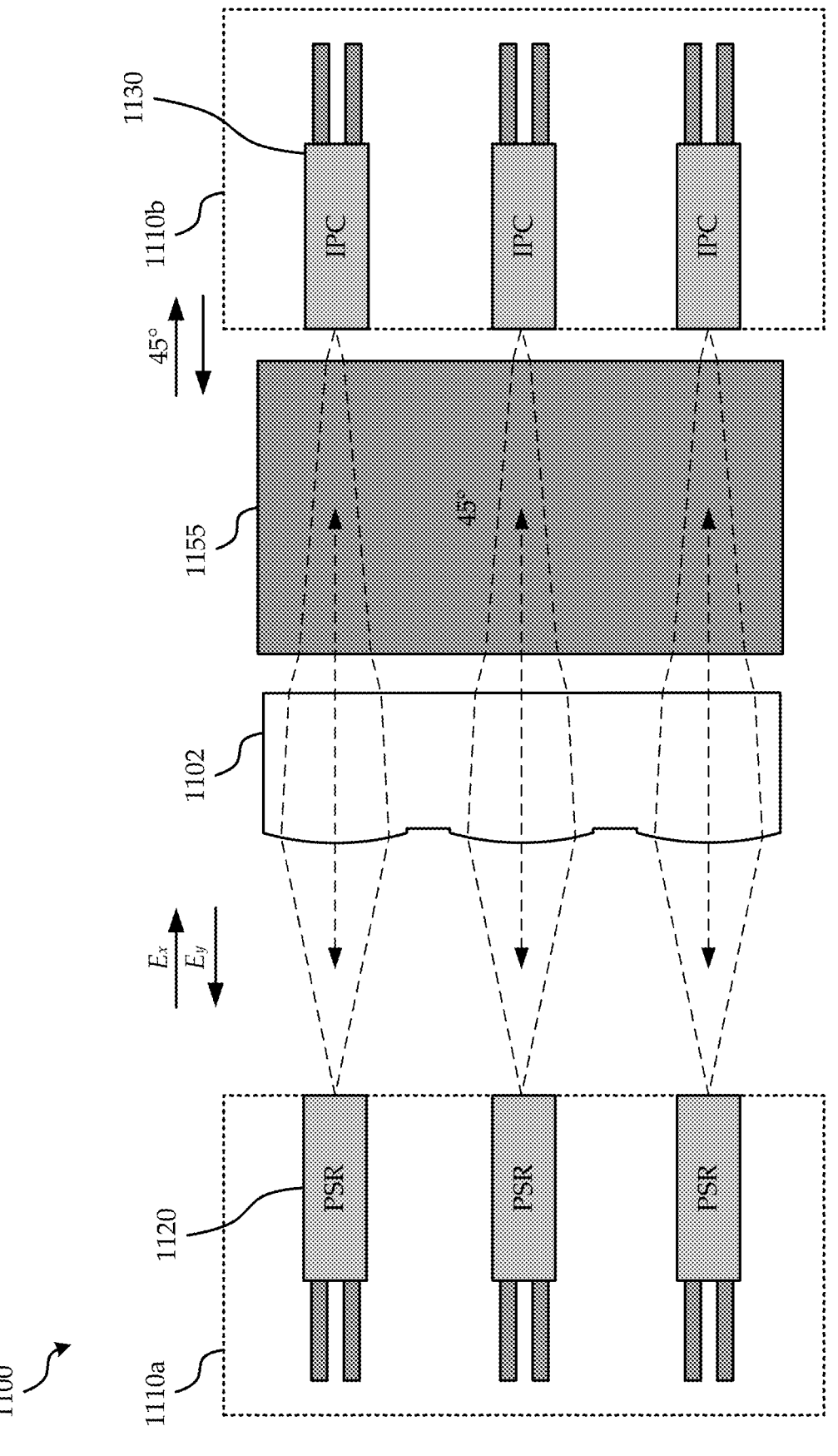
FIG. 11 is a schematic diagram of a multi-beam arrayed, single-stage, single-lens, integrated photonics circulator or isolator device incorporating IPCs according to an embodiment.

In some embodiments, devices utilizing multiple beams may be implemented, such as the device 1100 of FIG. 11, in which multiple lenses are arrayed adjacent each other on a single lens substrate and in which a shared large Faraday rotator is implemented. In some embodiments the array of lenses are controlled with single active alignment of the single substrate. The multiple beam embodiment of FIG. 11 in some implementations achieves a footprint for the device which totals just 2.5 mm×2.5 mm for 8 channels (only three shown).

As with the embodiments described hereinabove, the device 1100 includes a first integrated optical chip 1110a but includes a set of PSRs 1120 for multiple beams. To compensate for the absent second lenses, a single silicon substrate 1102 including an array of aspherical converging lenses are used between the first integrated optical chip 1110a and the Faraday rotator (45°) 1155 which is shared between the multiple optical beams (three shown). Optionally, the Faraday rotator may be split into two or more separate rotators, as many as one per beam, but sharing the rotator has advantages in cost and compactness. Materials other than silicon may be used for the aspheric lens array substrate 1102 such as glass or fused silica. In general, it is preferable for the lens substrate 1102 to be of a high index of refraction. Optical signals from the set of PSRs 1120 pass through the Faraday rotator 1155 and proceed to a respective set of coordinate IPCs 1030 (type I or type II) of the second integrated optical chip 1110b.

Figure 12:
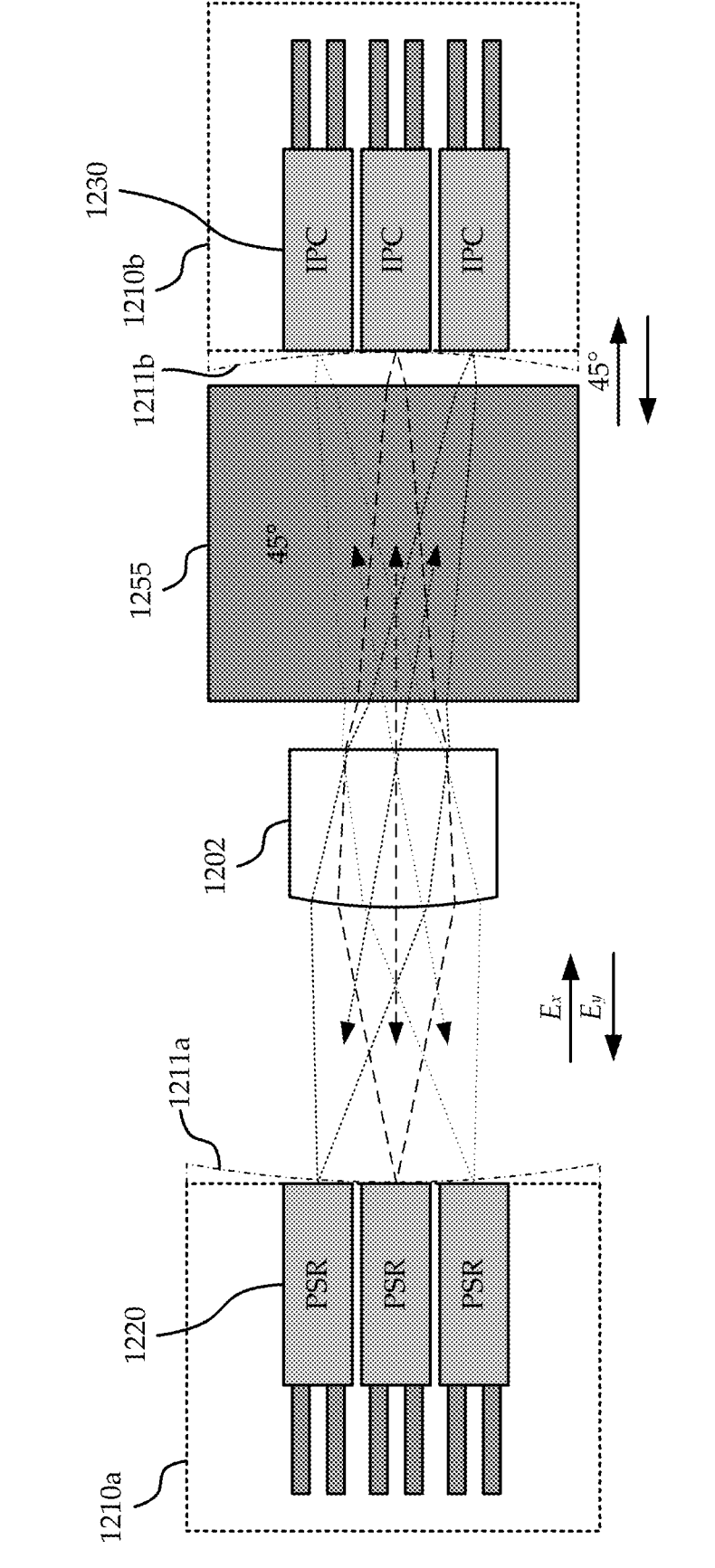
FIG. 12 is a schematic diagram of a multi-channel, single-stage, single-lens, integrated photonics circulator or isolator device incorporating IPCs according to an embodiment.

In some embodiments, devices utilizing multiple beams may be implemented, such as the device 1200 of FIG. 12, in which a single aspheric lens and Faraday rotator are shared. In this variation, multiple field points are imaged through the single lens and Faraday rotator, enabling reduction in the size of both. In some embodiments, the multiple beam device 1200 of FIG. 12 includes angled emitters or couplers coupling the PSRs to free space and in some embodiments the integrated optical chips include curved facets for improved performance. Curved facets mean that the individual channels of emitters are displaced along the optical axis (left/right in FIG. 12), so as to match any field curvature existing in the lens system. Angled emitters mean that the individual channels of emitters are tilted with respect to the optical axis so as to match better the chief ray angle of the beam incident upon them. With angled emitters reasonable performance can be obtained, in one implementation, for 9 channels spanning +/−40 um at a pitch of 10 um. Embodiments which also incorporate curved facets, in the same implementation, can extend reasonable performance to +/−80 um, enabling 17 channels without greatly increasing the footprint.

As with the embodiments described hereinabove, the device 1200 includes a first integrated optical chip 1210a and includes a set of PSRs 1220 for multiple beams. In some embodiments the facet 1211a of the first integrated optical chip 1210a is curved. A single silicon aspherical converging lens 1202 is used between the first integrated optical chip 1210a and the single Faraday rotator (45°) 1255 which is shared between the multiple optical beams (three shown). Materials other than silicon may be used for the aspheric converging lens 1202 such as glass or fused silica. In general, it is preferable for the converging lens 1202 to be of a high index of refraction. Optical signals from the set of PSRs 1220 pass through the Faraday rotator 1255 and proceed to a respective set of coordinate IPCs 1230 (type I or type II) of the second integrated optical chip 1210b which may or may not have a curved facet 1211b.

Figure 13:
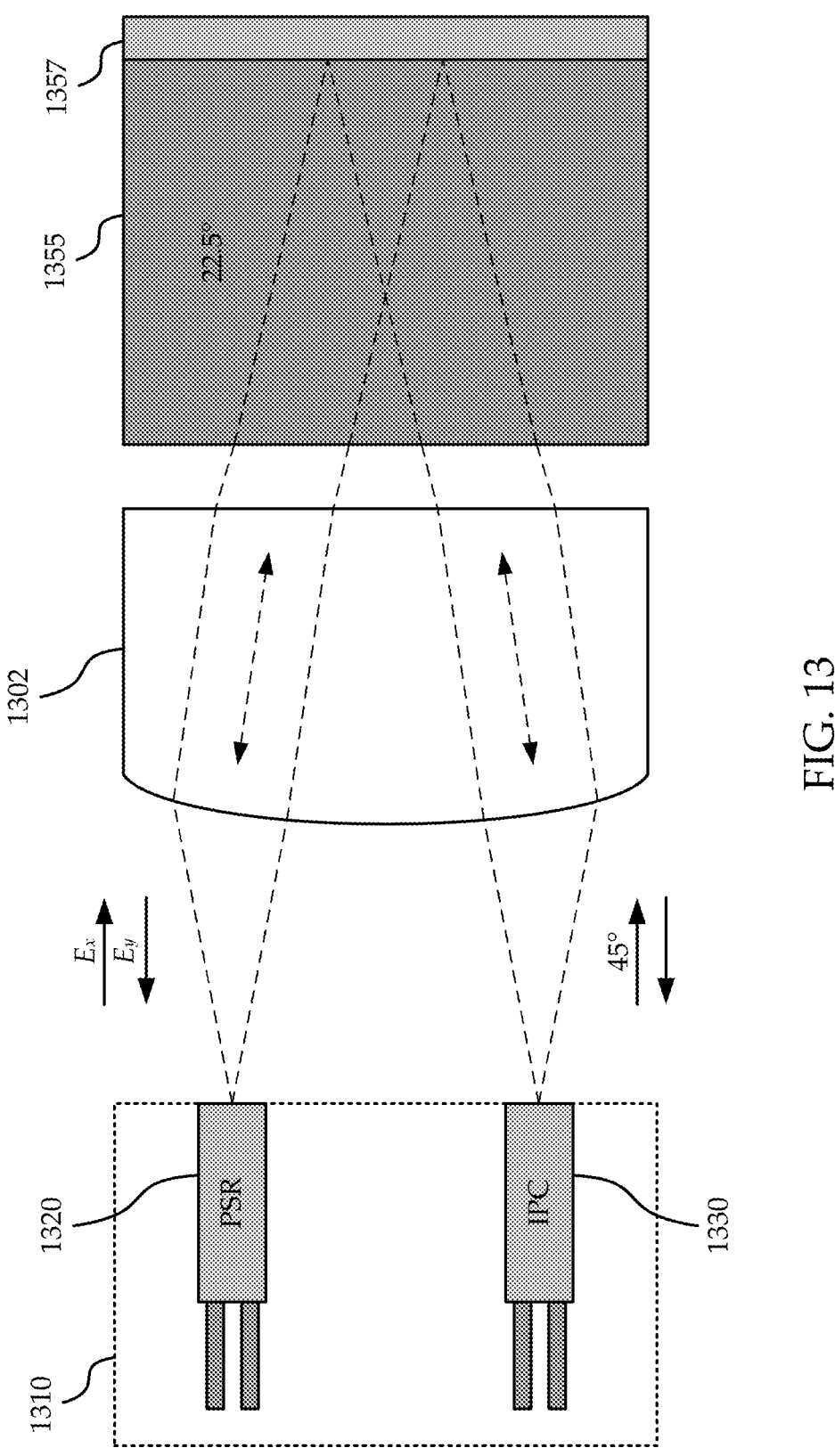
FIG. 13 is a schematic diagram of a reflective single-stage, single-lens, integrated photonics circulator or isolator device incorporating an IPC according to an embodiment.

In some embodiments, devices utilizing a single integrated optical chip for launching and receiving optical signals may be implemented, such as the device 1300 of FIG. 13, in which a reflector is used to reflect optical signals back through the Faraday rotator. This embodiment is similar to an aspheric lens variation of the embodiments of FIG. 3 or 9, "folded" in the middle of the Faraday rotator with use of a reflector, and in which PSRs and IPCs are offset on the same integrated optical chip.

Figure 16:
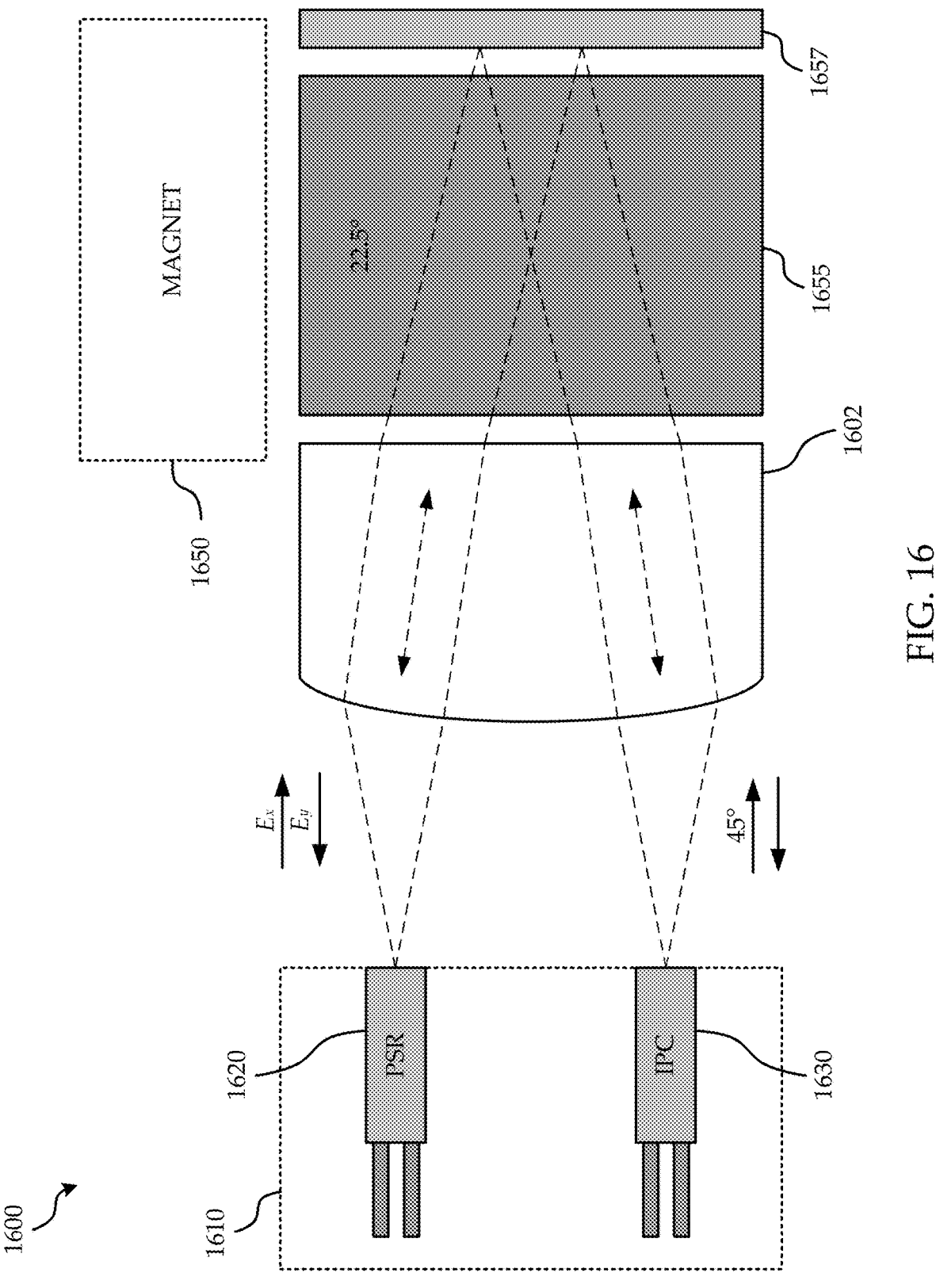
FIG. 16 is a schematic diagram of a single-stage integrated photonics circulator or isolator device, incorporating an IPC and including a separate lens, rotator, and reflector according to an embodiment.

As with the embodiments described hereinabove, the device 1300 includes an integrated optical chip 1310 and includes a PSR 1320. A single silicon aspherical converging lens 1302 is used between the integrated optical chip 1310 and the single Faraday rotator (22.5°) 1355. Materials other than silicon may be used for the aspheric converging lens 1302 such as glass or fused silica. In general, it is preferable for the converging lens 1302 to be of a high index of refraction. The Faraday rotator of this and other reflecting embodiments possesses the proper thickness to cause the desired rotation of 22.5° after a single pass and may comprise a rare-earth doped iron garnet. In cases where needed, an external permanent magnet or electromagnet such as that depicted in FIG. 16 is utilized, otherwise, for example in the case of a latching-type Faraday rotator, no external magnet is required. A reflector 1357 is situated on a side of the Faraday rotator 1355 opposite the converging lens 1302. Optical signals traverse from the converging lens 1302 through the Faraday rotator 1355 to obtain a rotation of the polarization states amounting to a 22.5° rotation (single pass), are then reflected from the reflector 1357 and back through the Faraday rotator obtaining an additional 22.5° to an accumulated total 45° of rotation of the polarization state before traversing the converging lens 1302 again. Optical signals returning to the integrated optical chip 1310 from the converging lens 1302 enter the IPC 1330 which is integrated in the integrated optical chip 1310 at a position offset from the PSR 1320. The PSR 1320 and IPC 1330 are positioned such that optical signals launched by the PSR 1320 pass through the converging lens 1302, the Faraday rotator 1355, and are reflected by the reflector 1357 back through the Faraday rotator 1355 and converging lens 1302 to enter the IPC 1330 and vice versa.

In some embodiments the reflector 1357 is a metal or dielectric coating with high reflectivity applied directly to the rear facet of the Faraday rotator 1355. Since the same length of Faraday rotator material is used twice, the same amount of rotation of polarization is achieved with half the length of Faraday rotator. In some implementations, the Faraday rotator has a thickness of 400 μm. In some embodiments, such as the embodiment of FIG. 16 a separate reflector or mirror may be employed but typically exhibits slightly less performance.

Although the embodiments depicted in FIG. 13 and FIGS. 14-18 below, have been described as including PSRs and IPCs on a single integrated optical chip, it should be understood that the PSRs and IPCs of all of the embodiments described herein may be integrated in any number of appropriately positioned integrated optical chips which may be separate or common to any number and combination of PSRs and IPCs and moreover, those integrated optical chips may or may not be integrated on a common substrate.

Figure 14:
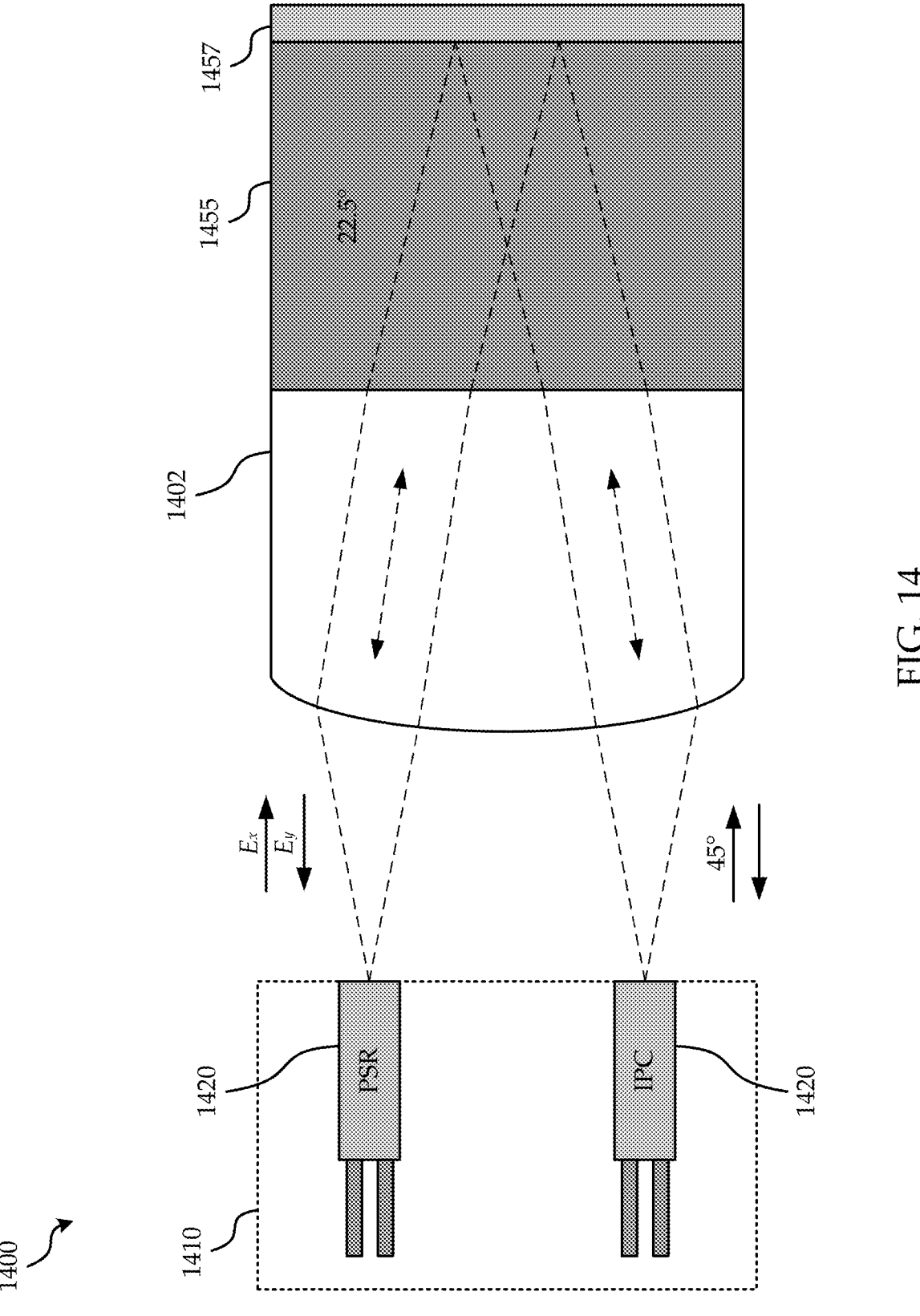
FIG. 14 is a schematic diagram of a reflective single-stage integrated photonics circulator or isolator device incorporating an IPC and including a bonded lens, rotator, reflector assembly according to an embodiment.

In an embodiment such as the device 1400 illustrated in FIG. 14, a design such as that illustrated in FIG. 13 is utilized, but instead of a separate lens and Faraday rotator arrangement, the lens and Faraday rotator are bonded to each other. In such an embodiment, the lens and Faraday rotator may be bonded using wafer-level manufacturing such as one piece active-align assembly techniques.

In some embodiments, due to the difference in the indices of refraction, an AR coating is deposited between the lens (n=3.46 for Si) and Faraday rotator (n=2.2-2.5).

As with the embodiments described hereinabove, the device 1400 includes an integrated optical chip 1410 and includes a PSR 1420. A single silicon aspherical converging lens 1402 is used between the integrated optical chip 1410 and the single Faraday rotator (22.5°) 1455 to which it is bonded. Materials other than silicon may be used for the aspheric converging lens 1402 such as glass or fused silica. In general, it is preferable for the converging lens 1402 to be of a high index of refraction. The Faraday rotator of this and other reflecting embodiments possesses the proper thickness to cause the desired rotation of 22.5° after a single pass and may comprise a rare-earth doped iron garnet. In cases where needed, an external permanent magnet or electromagnet such as that depicted in FIG. 16 is utilized, otherwise, for example in the case of a latching-type Faraday rotator, no external magnet is required. A reflector 1457 is bonded on a side of the Faraday rotator 1455 opposite the converging lens 1402. Optical signals traverse from the converging lens 1402 through the Faraday rotator 1455 to obtain a rotation of the polarization states amounting to a 22.5° rotation, are then reflected from the reflector 1457 and back through the Faraday rotator obtaining an additional 22.5° to an accumulated total 45° of rotation of the polarization state before traversing the converging lens 1402 again. Optical signals returning to the integrated optical chip 1410 from the converging lens 1402 enter the IPC 1430 which is integrated in the integrated optical chip 1410 at a position offset from the PSR 1420 The PSR 1420 and IPC 1430 are positioned such that optical signals launched by the PSR 1420 pass through the converging lens 1402, the Faraday rotator 1455, and are reflected by the reflector 1457 back through the Faraday rotator 1455 and converging lens 1402 to enter the IPC 1430 and vice versa.

Figure 15:
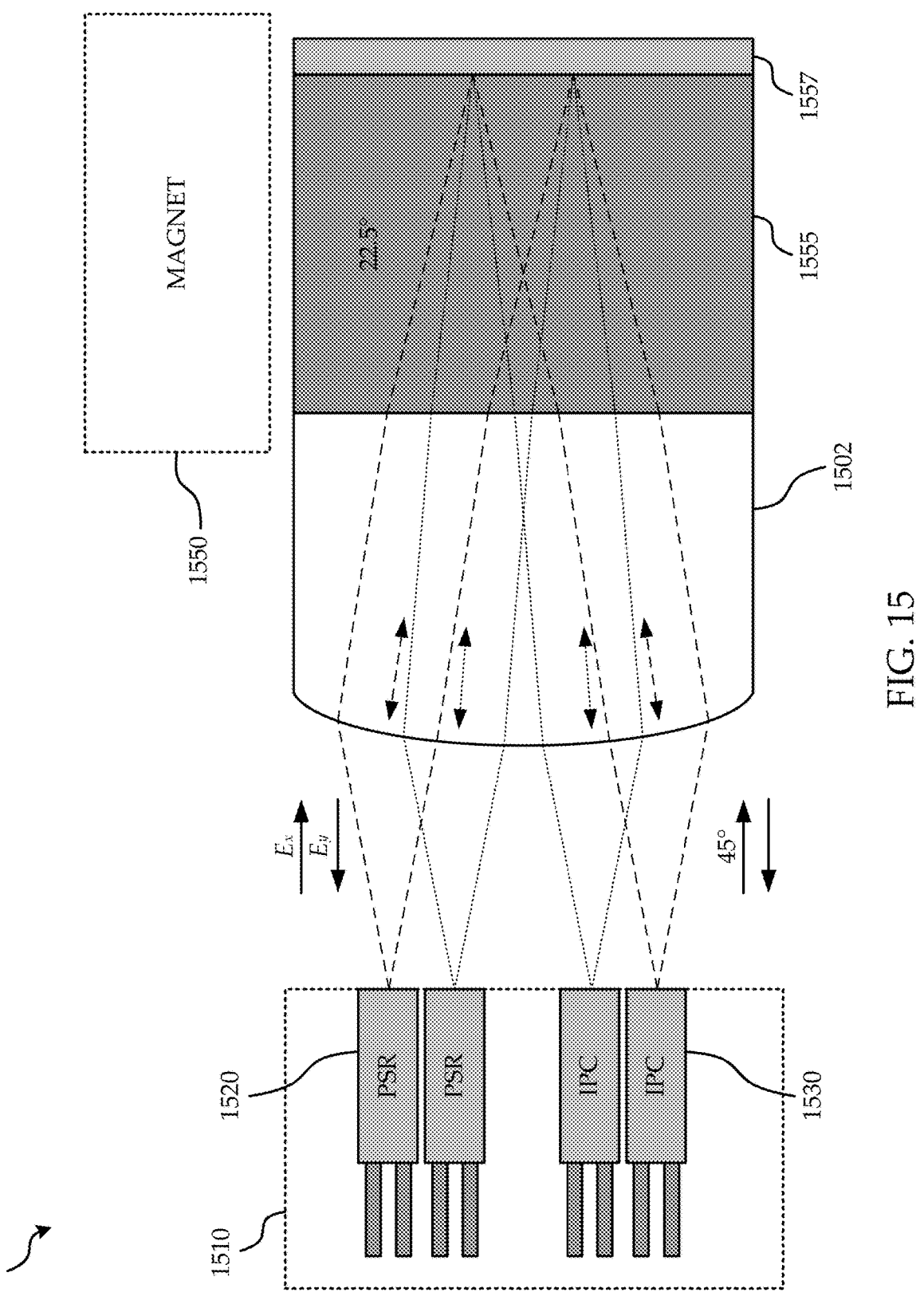
FIG. 15 is a schematic diagram of a multi-channel, single-stage, integrated photonics circulator or isolator device, incorporating IPCs and including a bonded lens, rotator, reflector assembly according to an embodiment.

In some embodiments, devices utilizing multiple beams may be implemented, such as the device 1500 of FIG. 15, in which a single aspheric lens bonded to a Faraday rotator are shared. In this variation, multiple field points are imaged through the single lens bonded to a Faraday rotator, enabling reduction in the size of both, and by virtue of the beams traversing the Faraday rotator twice due to the reflector, its length is halved. Multiple channels (two shown) are supported on the device by the reflective lens-rotator assembly connecting pairs of PSRs and IPCs on either side of a central axis.

As with the embodiments described hereinabove, the device 1500 includes an integrated optical chip 1510 and includes a set of PSRs 1520 for multiple beams. A single aspherical converging lens 1502 is used between the integrated optical chip 1510 and the single Faraday rotator (22.5°) 1455 to which it is bonded and which is shared between the multiple optical beams (two shown). In cases where needed, an external permanent magnet or electromagnet 1550 is utilized, otherwise, for example in the case of a latching-type Faraday rotator, no external magnet is required. A reflector 1557 is fixed on a side of the Faraday rotator 1555 opposite the converging lens 1502. Optical signals from the set of PSRs 1520 traverse from the converging lens 1502 through the Faraday rotator 1555 to obtain a rotation of the polarization states amounting to a 22.5° rotation, are then reflected from the reflector 1557 and back through the Faraday rotator obtaining an additional 22.5° to an accumulated total 45° of rotation of the polarization state before traversing the converging lens 1502 again. Optical signals returning to the integrated optical chip 1510 enter the respective set of coordinate IPCs 1530 which are integrated in the integrated optical chip 1510 at a positions offset from the PSRs 1520 The PSRs 1520 and IPCs 1530 are positioned such that optical signals launched by the PSRs 1520 pass through the converging lens 1502, the Faraday rotator 1555, and are reflected by the reflector 1557 back through the Faraday rotator 1555 and converging lens 1502 to enter the IPCs 1530 and vice versa.

In embodiments similar to that of FIG. 13, such as in the device 1600 of FIG. 16, the lens, Faraday rotator, and reflector may be separate from each other. In the embodiment depicted in FIG. 16 a separate reflector or mirror is employed, such is less preferable from a performance standpoint, however, in some manufacturing contexts a reduction in fabrication costs or complexity may be of higher priority.

As with the embodiments described hereinabove, the device 1600 includes an integrated optical chip 1610 and includes a PSR 1620. A single aspherical converging lens 1602 is used between the integrated optical chip 1610 and the single Faraday rotator (22.5°) 1655. In cases where needed, an external permanent magnet or electromagnet 1650 is utilized, otherwise, for example in the case of a latching-type Faraday rotator, no external magnet is required. A reflector 1657 is situated and spaced apart on a side of the Faraday rotator 1655 opposite the converging lens 1602. Optical signals traverse from the converging lens 1602 through the Faraday rotator 1655 to obtain a rotation of the polarization states amounting to a 22.5° rotation (single pass), are then reflected from the reflector 1657 and back through the Faraday rotator obtaining an additional 22.5° to an accumulated total 45° of rotation of the polarization state before traversing the converging lens 1602 again. Optical signals returning to the integrated optical chip 1610 from the converging lens 1602 enter the IPC 1630 which is integrated in the integrated optical chip 1610 at a position offset from the PSR 1620. The PSR 1620 and IPC 1630 are positioned such that optical signals launched by the PSR 1620 pass through the converging lens 1602, the Faraday rotator 1655, and are reflected by the reflector 1657 back through the Faraday rotator 1655 and converging lens 1602 to enter the IPC 1630 and vice versa.

It should be understood that due to the way the PSRs and IPCs of the embodiments described hereinabove function, the PSR and IPC of any PSR-IPC pair may be interchanged. In those embodiments the TE optical signals may be launched from the IPC with a polarization (such as 45°) which the Faraday rotator brings to 90° prior to receipt by a PSR and transmission over its second component-side port as TE. In the reverse direction, TE optical signals entering the PSR would emerge at 90° prior to being rotated by the Faraday rotator to 135° after which point it would enter the IPC to be discarded or rerouted as TE over the IPC's other component-side port.

Figure 17:
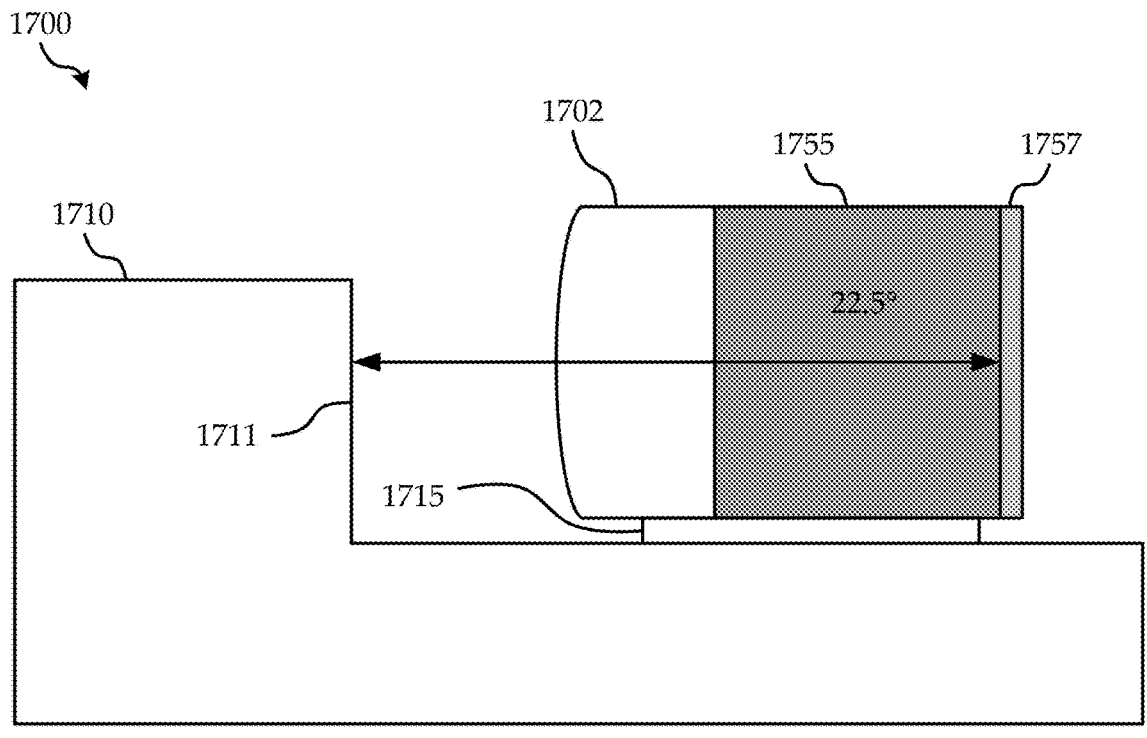
FIG. 17 is a schematic diagram of an on-chip assembly of an integrated circulator or isolator device with a bonded lens, rotator, reflector assembly according to an embodiment.
Figure 18:
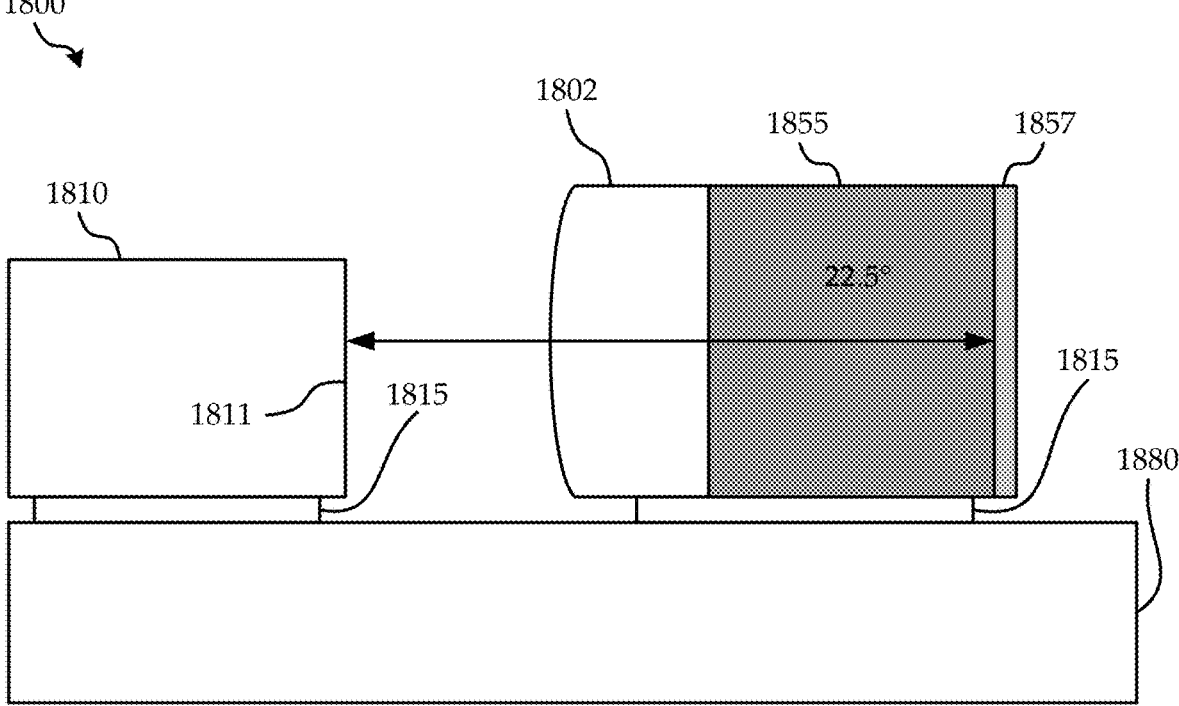
FIG. 18 is a schematic diagram of an on-chip assembly of an integrated circulator or isolator device with a bonded lens, rotator, reflector assembly according to an embodiment including a common substrate.

FIGS. 17 and 18 illustrate example on-chip assemblies for reflector embodiments similar to those described above.

In the on-chip assembly 1700 illustrated in FIG. 17, a reflector 1757, converging lens 1702, Faraday rotator 1755 assembly sits atop a photonics die 1710 in a lower portion or etched cavity, adjacent a facet 1711 of the photonics die 1710, and is bonded to it with adhesive or solder 1715. The facet 1711 in the photonics die 1710 corresponds to a facet of the integrated optics chip in which the PSRs and IPCs are integrated as described above.

In the on-chip assembly 1800 illustrated in FIG. 18, a reflector 1857, converging lens 1802, Faraday rotator 1855 assembly sits atop a common substrate or interposer 1880, adjacent a facet 1811 of a photonics chip 1810, and is bonded with adhesive or solder 1815 to the common substrate or interposer 1880. The photonics chip 1810 is also bonded to the common substrate or interposer 1880 with adhesive or solder 1815. The facet 1811 corresponds to a facet of the integrated optics chip in which the PSRs and IPCs are integrated as described above.

In terms of performance for the reflective embodiments described in association with FIGS. 13-18, in one context, normal incidence emitters can achieve multichannel performance over a +/−160 um field (16 ch on 10 um pitch or 8 ch in 20 um pitch) of >0.94 Strehl, with a footprint within 1.2×0.5 mm (200×200 μm per channel) not including the PSR area. In a variation in which the emitters were angled relative to the focal plane, and a larger chip-lens distance (an additional 0.6 mm) was used, the field was able to be doubled to +/−320 μm with double the channels, i.e. 32 ch on 10 um pitch or 16 ch in 20 um pitch, with only a nominal performance reduction to 0.89 Strehl.

Figure 19:
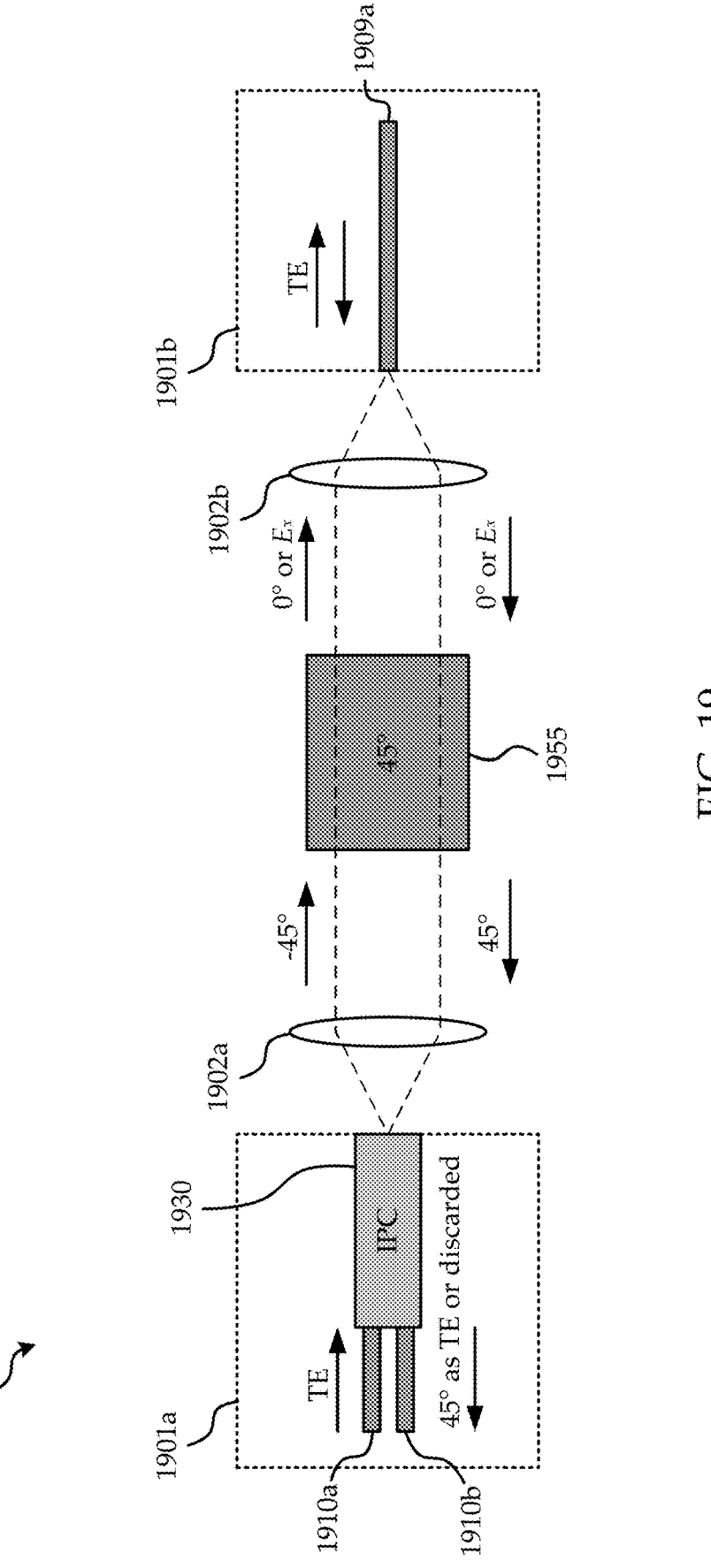
FIG. 19 is a schematic diagram of an integrated photonics circulator or isolator device including a single IPC according to an embodiment.

In some embodiments, one of each pair of integrated polarizing devices (e.g. 330, 1030, 1130, 1230, 1330, 1430, 1530, 1630) can be entirely dispensed with, and replaced with a coupler or emitter coupled into the integrated chip while the IPC is utilized as the remaining integrated polarizing device. Such a variation is illustrated in FIG. 19 which corresponds to an embodiment similar to that of FIGS. 3 and 9 but with only one integrated polarizing device. In such an embodiment 1900, an IPC 1930 on an integrated chip 1901a is used to receive the original TE optical signal over one of its component-side ports 1910a, and then convert it into a −45° polarized optical signal before launching it through a lens 1902a towards the Faraday rotator 1955. The Faraday rotator 1955 (and mirror, in folded embodiments) rotates a polarization of the optical signal to 0° or TE, after which it passes through a second lens 1902b (or the same lens, in folded embodiments) and is collected by a coupler or emitter on a receiving port of a waveguide 1909a of the integrated chip 1901b. In the reverse direction, TE (0°) optical signals launched from the waveguide 1909a into free space pass through the second lens 1902b encounter the Faraday rotator 1955, emerge with a polarization of 45°, pass through a lens 1902a, and upon entering the IPC's 1930 polarization side port, is discarded or rerouted "as TE" over the IPC's other component-side port 1920*b* or simply discarded whether it has a second component-side port or not.

In some embodiments, an additional polarizing device may be situated on any of the component-side ports or waveguides (e.g. ports or waveguides 9100*a*, 9100*b*, 9009*a*, 9009*b*, 1910*a*, 1910*b*, or 1909*a*) to substantially attenuate light in these waveguides not in the TE mode. This polarizing device may be, for example, a PSR oriented with its component-side TE port facing the isolator or circulator structure and its polarization-side port forming the new input or output of the isolator or circulator (e.g. 9000 or 1900) coupled into the respective integrated chip. In these embodiments, any TM mode optical signals intercepted by the PSR on their way toward the isolator or circulator are directed away from the isolator or circulator to the component-side "TM as TE" port of the PSR and may be discarded.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An integrated photonics system comprising:
   at least one integrated chip;
   a first integrated polarizing device integrated in the at least one integrated chip for launching a first input optical signal received over a first component-side port of the first integrated polarizing device as a first polarized optical signal over a polarization-side port of the first integrated polarizing device into free space;
   at least one Faraday rotator for receiving the first polarized optical signal, rotating a polarization of the first polarized optical signal, and generating a rotated first polarized optical signal travelling in a first direction, and for receiving a second polarized optical signal having the same polarization as the rotated first polarized optical signal and travelling in a second direction opposite from the first direction, rotating a polarization of the second polarized optical signal, and generating a rotated second polarized optical signal;
   wherein the first integrated polarizing device is configured to receive the rotated second polarized optical signal over the polarization-side port of the first integrated polarizing device and to direct the rotated second polarized optical signal away from the first component-side port of the first integrated polarizing device,
   wherein the integrated photonics system further comprises:
   a second integrated polarizing device integrated in the at least one integrated chip for launching the rotated first polarized optical signal received over a polarization-side port of the second integrated polarizing device as an output optical signal over a component-side port of the second integrated polarizing device, and for launching a second input optical signal received over the component-side port as the second polarized optical signal over the polarization-side port into free space toward the at least one Faraday rotator,
   wherein the second integrated polarizing device comprises an integrated polarization controller (IPC) for generating the output optical signal with a polarization which is different from the polarization of the rotated first polarized optical signal, and for generating the second polarized optical signal from the second input optical signal, the second input optical signal having the same polarization as the output optical signal.

2. The integrated photonics system of claim 1, wherein the first integrated polarizing device is configured to substantially discard the rotated second polarized optical signal received by the first integrated polarizing device.

3. The integrated photonics system of claim 1, wherein the first integrated polarizing device is configured to substantially direct the rotated second polarized optical signal received by the first integrated polarizing device over a second component-side port of the first integrated polarizing device.

4. The integrated photonics system of claim 1, wherein the IPC comprises:
   a polarization-side port facing the Faraday rotator;
   at least one component-side port opposite the polarization-side port of the IPC;
   a polarization splitter rotator PSR including a first, a second, and a third port, the PSR coupled via its first port, over the polarization-side port of the IPC;
   a first set of waveguides coupled to the second and third ports of the PSR;
   a first phase shifter coupled along a first waveguide of the first set of waveguides; and
   a first splitter including a first set of ports and a second set of ports, the first splitter coupled to the PSR via its first set of ports and over the first set of waveguides, and coupled over at least one port of its second set of ports, via the at least one component-side port of the IPC.

5. The integrated photonics system of claim 1, further comprising a lens between the first integrated polarizing device and the Faraday rotator.

6. The integrated photonics system of claim 5, wherein the at least one Faraday rotator includes a 22.5° Faraday rotator, and wherein the integrated photonics system further comprises:
   a reflector situated on a side of the 22.5° Faraday rotator opposite the lens, for reflecting optical signals traversing the 22.5° Faraday rotator from the lens back into the 22.5° Faraday rotator towards the lens.

7. The integrated photonics system of claim 6, wherein the first integrated polarizing device is configured to substantially discard the rotated second polarized optical signal received by the first integrated polarizing device.

8. The integrated photonics system of claim 6, wherein the first integrated polarizing device is configured to substantially direct the rotated second polarized optical signal received by the first integrated polarizing device over a second component-side port of the first integrated polarizing device.

9. The integrated photonics system of claim 6, wherein the IPC comprises:
   a polarization-side port facing the 22.5° Faraday rotator;
   at least one component-side port opposite the polarization-side port of the IPC;
   a polarization splitter rotator PSR including a first, a second, and a third port, the PSR coupled via its first port, over the polarization-side port of the IPC;
   a first set of waveguides coupled to the second and third ports of the PSR;
   a first phase shifter coupled along a first waveguide of the first set of waveguides; and
   a first splitter including a first set of ports and a second set of ports, the first splitter coupled to the PSR via its first set of ports and over the first set of waveguides, and coupled over at least one port of its second set of ports, via the at least one component-side port of the IPC.

10. The integrated photonics system of claim 6, wherein the first integrated polarizing device is one of a plurality of first integrated polarizing devices included in the integrated photonics system, wherein the IPC is one of a plurality of IPCs included in the integrated photonics system, and wherein the 22.5° Faraday rotator comprises a shared 22.5° Faraday rotator for rotating polarizations of optical signals transmitted between said plurality of first integrated polarizing devices and said plurality of IPCs.

11. The integrated photonics system of claim 10, wherein the lens includes a single shared lens between the plurality of first integrated polarizing devices and the shared 22.5° Faraday rotator, and wherein each first integrated polarizing device of the plurality of first integrated polarizing devices and each IPC of the plurality of IPCs is angled relative to a focal plane of the single shared lens and the at least one integrated chip includes curved facets proximate locations where the first integrated polarizing devices and IPCs are integrated therein.

12. The integrated photonics system of claim 6, wherein the lens, the reflector, and the 22.5° Faraday rotator are bonded together into a single lens-rotator-reflector assembly.

13. The integrated photonics system of claim 12, wherein the lens-rotator-reflector assembly is mounted on one or more of the at least one integrated chip or mounted on a common substrate on which the at least one integrated chip is mounted.

14. The integrated photonics system of claim 5, wherein the at least one Faraday rotator includes a 45° Faraday rotator.

15. The integrated photonics system of claim 14, wherein the first integrated polarizing device is configured to substantially discard the rotated second polarized optical signal received by the first integrated polarizing device.

16. The integrated photonics system of claim 14, wherein the first integrated polarizing device is configured to substantially direct the rotated second polarized optical signal received by the first integrated polarizing device over a second component-side port of the first integrated polarizing device.

17. The integrated photonics system of claim 14, wherein the IPC comprises:
a polarization-side port facing the 45° Faraday rotator;
at least one component-side port opposite the polarization-side port of the IPC;
a polarization splitter rotator PSR including a first, a second, and a third port, the PSR coupled via its first port, over the polarization-side port of the IPC;
a first set of waveguides coupled to the second and third ports of the PSR;
a first phase shifter coupled along a first waveguide of the first set of waveguides; and
a first splitter including a first set of ports and a second set of ports, the first splitter coupled to the PSR via its first set of ports and over the first set of waveguides and coupled over at least one port of its second set of ports, via the at least one component-side port of the IPC.

18. The integrated photonics system of claim 14, wherein the first integrated polarizing device is one of a plurality of first integrated polarizing devices included in the integrated photonics system, wherein the IPC is one of a plurality of IPCs included in the integrated photonics system, and wherein the 45° Faraday rotator comprises a shared 45° Faraday rotator for rotating polarizations of optical signals transmitted between said plurality of first integrated polarizing devices and said plurality of IPCs.

19. The integrated photonics system of claim 18, wherein the lens includes a single shared lens between the plurality of first integrated polarizing devices and the shared 45° Faraday rotator, and wherein each first integrated polarizing device of the plurality of first integrated polarizing devices and each IPC of the plurality of IPCs is angled relative to a focal plane of the single shared lens and the at least one integrated chip includes curved facets proximate locations where the first integrated polarizing devices and IPCs are integrated therein.

20. The integrated photonics system of claim 1, wherein the first integrated polarizing device is one of a plurality of first integrated polarizing devices included in the integrated photonics system, wherein the IPC is one of a plurality of IPCs included in the integrated photonics system, and wherein the Faraday rotator comprises a shared Faraday rotator for rotating polarizations of optical signals transmitted between said plurality of first integrated polarizing devices and said plurality of IPCs.

21. The integrated photonics system of claim 20, further comprising an array of lenses between the plurality of first integrated polarizing devices and the shared Faraday rotator.

22. The integrated photonics system of claim 20, further comprising a single shared lens between the plurality of first integrated polarizing devices and the shared Faraday rotator.

23. The integrated photonics system of claim 22, wherein each first integrated polarizing device of the plurality of first integrated polarizing devices and each IPC of the plurality of IPCs is angled relative to a focal plane of the single shared lens and the at least one integrated chip includes curved facets proximate locations where the first integrated polarizing devices and IPCs are integrated therein.

24. An integrated photonics system comprising:
at least one integrated chip;
a first integrated polarizing device integrated in the at least one integrated chip for launching a first input optical signal received over a first component-side port of the first integrated polarizing device as a first polarized optical signal over a polarization-side port of the first integrated polarizing device into free space; and
at least one Faraday rotator for receiving the first polarized optical signal, rotating a polarization of the first polarized optical signal, and generating a rotated first polarized optical signal travelling in a first direction, and for receiving a second polarized optical signal having the same polarization as the rotated first polarized optical signal and travelling in a second direction opposite from the first direction, rotating a polarization of the second polarized optical signal, and generating a rotated second polarized optical signal;
wherein the first integrated polarizing device is configured to receive the rotated second polarized optical signal over the polarization-side port of the first integrated polarizing device and to direct the rotated second polarized optical signal away from the first component-side port of the first integrated polarizing device and
wherein the at least one Faraday rotator includes a 22.5° Faraday rotator, and wherein the integrated photonics system further comprises:
a lens between the first integrated polarizing device and the 22.5° Faraday rotator; and
a reflector situated on a side of the 22.5° Faraday rotator opposite the lens, for reflecting optical signals traversing the 22.5° Faraday rotator from the lens back into the 22.5° Faraday rotator towards the lens;

wherein the first integrated polarizing device comprises an IPC for generating the first polarized optical signal with a polarization which is different from the polarization of the first input optical signal.

25. The integrated photonics system of claim 24, wherein the IPC is configured to substantially discard the rotated second polarized optical signal received by the IPC.

26. The integrated photonics system of claim 24, wherein the IPC is configured to substantially direct the rotated second polarized optical signal received by the IPC over a second component-side port of the IPC.

\* \* \* \* \*